(12) United States Patent
Lim et al.

(10) Patent No.: US 10,893,124 B2
(45) Date of Patent: Jan. 12, 2021

(54) WORKING ENVIRONMENT PROVISIONING METHOD AND APPARATUS FOR EXECUTION OF APPLICATION PROGRAM BETWEEN ELECTRONIC DEVICE AND EXTERNAL SERVER

(71) Applicant: Samsung Electronics Co., Ltd., Gyeonggi-do (KR)

(72) Inventors: Kiyoung Lim, Gyeonggi-do (KR); Wonsuk Lee, Gyeonggi-do (KR); Jungkih Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/748,414

(22) Filed: Jan. 21, 2020

(65) Prior Publication Data
US 2020/0236194 A1 Jul. 23, 2020

(30) Foreign Application Priority Data
Jan. 18, 2019 (KR) .................. 10-2019-0006966

(51) Int. Cl.
H04L 29/08 (2006.01)
H04W 4/70 (2018.01)
H04L 29/06 (2006.01)

(52) U.S. Cl.
CPC .......... *H04L 67/327* (2013.01); *H04L 67/40* (2013.01); *H04L 67/42* (2013.01); *H04W 4/70* (2018.02)

(58) Field of Classification Search
CPC ....... H04L 67/327; H04L 67/40; H04L 67/42; H04W 4/70
See application file for complete search history.

(56) References Cited

U.S. PATENT DOCUMENTS 6,184,860 B1* 2/2001 Yamakawa ......... G06F 3/04842
715/823
6,304,277 B1* 10/2001 Hoekstra ................ G06T 11/60
345/600
9,148,473 B1 9/2015 Sharma
(Continued)

OTHER PUBLICATIONS

International Search Report dated Apr. 28, 2020 issued in counterpart application No. PCT/KR2020/000958, 8 pages.

*Primary Examiner* — Arvin Eskandarnia
(74) *Attorney, Agent, or Firm* — The Farrell Law Firm, P.C.

(57) ABSTRACT

An electronic device includes display, radio communication circuit configured to perform radio communication, at least one processor operatively connected to display and radio communication circuit, and memory operatively connected to the at least one processor and configured to store a first application program including a first user interface and to store instructions, executable by the at least one processor, for establishing a connection to an external server including a second application program executable in place of at least part of operations of a first application program via the radio communication circuit, executing, upon receipt of a first user input associated with the first application program, the first application program, displaying a first user interface of the first application program on the display, and displaying, upon receipt of a second user input associated with the first application program, a second user interface associated with the second application program on the display.

20 Claims, 15 Drawing Sheets

(56) References Cited

U.S. PATENT DOCUMENTS

| | | |
|---|---|---|
| 9,967,757 B2 | 5/2018 | Tehrani et al. |
| 10,013,282 B2 | 7/2018 | Calvanese Strinati et al. |
| 10,048,977 B2 | 8/2018 | Palermo et al. |
| 10,061,620 B2 | 8/2018 | Gandhi |
| 10,067,805 B2 | 9/2018 | Sun et al. |
| 10,067,893 B2 | 9/2018 | Egi et al. |
| 2002/0073121 A1* | 6/2002 | Sano ............... G06F 40/166 715/255 |
| 2005/0152004 A1* | 7/2005 | Park ............... H04N 1/00236 358/1.18 |
| 2006/0072166 A1* | 4/2006 | Fuchs ............... G06T 11/60 358/452 |
| 2007/0030506 A1* | 2/2007 | Takabayashi ...... H04N 1/6013 358/1.9 |
| 2007/0046698 A1* | 3/2007 | Nam ............... G06F 3/14 345/660 |
| 2007/0121141 A1* | 5/2007 | Takabayashi ...... G06K 15/1872 358/1.9 |
| 2007/0260979 A1* | 11/2007 | Hertzfeld ............ G06T 11/60 715/209 |
| 2014/0143313 A1 | 5/2014 | Tanaka et al. |
| 2014/0358482 A1 | 12/2014 | Sehgal et al. |
| 2015/0081764 A1 | 3/2015 | Zhao et al. |
| 2019/0018719 A1 | 1/2019 | Brin |

* cited by examiner

WORKING ENVIRONMENT PROVISIONING METHOD AND APPARATUS FOR EXECUTION OF APPLICATION PROGRAM BETWEEN ELECTRONIC DEVICE AND EXTERNAL SERVER

CROSS-REFERENCE TO RELATED APPLICATION(S)

This application is based on and claims priority under 35 U.S.C. § 119 to Korean Patent Application No. 10-2019-0006966 filed on Jan. 18, 2019 in the Korean Intellectual Property Office, the disclosure of which is incorporated by reference herein in its entirety.

BACKGROUND

1. Field

The disclosure relates to a working environment provisioning method and apparatus for executing an application program between an electronic device and an external server.

2. Description of the Related Art

The recent advance of digital technologies has popularized the use of various types of electronic devices such as a mobile communication terminal, a smartphone, a tablet personal computer (PC), a laptop PC, and a desktop PC. Such an electronic device is provided with computing resources (e.g., a processor and memory) for executing an application program, which outputs an execution result (e.g., video and/or audio data) to a user. However, constrained computing resources of an electronic device may limit a computing quality required by an application program, leading to a failure to measure up to what a user wants to experience with the application program.

Thus, the user may have to endure limits in battery consumption, processing time, and response speed, when executing a high performance-demanding application program, depending on the capability of the electronic device, or should use a high performance electronic device or downgrade the output quality (e.g., resolution and graphic acceleration capability) for moderate execution of the high performance-demanding application program. For example, an application program, even though it has been successfully installed in an electronic device, may not provide normal execution or a corresponding service to a user because of a shortage of computing resources.

Recently, a technology called virtual mobile infrastructure (VMI) has been introduced for executing an application program using computing resources of a remote computing device (e.g., an external server). In order for a user to use VMI, it is necessary for a complex set-up to be handled for creating an environment for use of VMI, which requires much effort for setting-up and administrative inconvenience. Even if an environment for use of VMI has been set up, the independent working environment (e.g., executing an application program and saving the execution result in an independent and individual manner) required between the electronic device and the external server may make it difficult to guarantee (or secure) a working continuity of the application program to the user and may limit the user's access. Working remotely in a working environment provided by an external server may pose potential risks of network breakage and loss of working output.

SUMMARY

An aspect of the present disclosure provides a VMI provisioning method and apparatus that are capable of executing an application program based on remote computing resources and outputting an execution result (e.g., data) to an electronic device.

Another aspect of the present disclosure provides a VMI provisioning method and apparatus that are capable of providing a continuous working environment of an application program between an electronic device and an external server in order to execute the application program using computing resources of the external server instead of those of the electronic device and return an execution result to the electronic device.

Another aspect of the present disclosure provides a VMI provisioning method and apparatus that are capable of overcoming application program execution constraints caused by a lack of computing capability of an electronic device using computing resources of an external server and securing a continuity of a task at a point in time when an application program is executed on an external server by synchronizing user data between an electronic device and the external server as soon as the electronic device is allocated the computing resources of the external server.

Another aspect of the present disclosure provides a virtual mobile environment provisioning method and apparatus that are capable of providing a continuous working environment, even when an electronic device is not connected to a network, by allowing an external server to synchronize an output as an execution result of an application program with the electronic device.

According to an aspect of the present disclosure, an electronic device is provided. The electronic device includes a display, a radio communication circuit configured to perform radio communication, at least one processor operatively connected to the display and the radio communication circuit, and a memory operatively connected to the at least one processor and configured to store a first application program including a first user interface and to store instructions, executable by the at least one processor, for establishing a connection to an external server including a second application program executable in place of at least part of operations of a first application program via the radio communication circuit, executing, upon receipt of a first user input associated with the first application program, the first application program, displaying a first user interface of the first application program on the display, and displaying, upon receipt of a second user input associated with the first application program, a second user interface associated with the second application program on the display.

According to another aspect of the present disclosure, a method of an electronic device is provided. The method includes establishing a connection to an external server including a second application program executable in place of at least part of operations of a first application program via a radio communication circuit, executing, upon receipt of a first user input associated with the first application program, the first application program, displaying a first user interface of the first application program on a display, and displaying, upon receipt of a second user input associated with the first application program, a second user interface associated with the second application program on the display.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

According to various embodiments, an electronic device and an operation method thereof are capable of providing a user with services corresponding to various application programs demanding high performance computing resources from a resource-constrained electronic device in an independent manner, anytime and anywhere. The electronic device and the operation method thereof are also capable of executing an application program with computing resources of an external server instead of the electronic device and providing a continuous working environment for the application program between the electronic device and an external server to return an execution result to the electronic device. The electronic device and the operation method thereof are capable of synchronizing input/output of an application program running on an external server with the electronic device, thereby providing a continuous working environment in which a user feels as if the application program is running on the electronic device. The electronic device and the operation method thereof are capable of allowing a user to continue executing the application program even when the electronic device is disconnected from a network according to a condition of the network.

According to various embodiments, the electronic device and the operation method thereof is advantageous in terms of facilitating a user's decision making on whether to execute virtual execution of an application program (e.g., executing an application program using computing resources of an external server) by allowing the user to select an environment (e.g., computing resources) for executing the application program on the external server and proving the user with information on gain expected with the virtual execution in advance. The electronic device and the operation method thereof are advantageous in terms of allowing a user to select an environment for executing an application program on an external server in consideration of an actual situation (e.g., cost and computing resources (or capability) of the electronic device). The electronic device and the operation method thereof are advantageous in terms of increasing battery life time and processing speed of an application program and overcoming a poor application program execution environment caused by constrained capability of the electronic device by providing a continuous working environment for executing the application program between the electronic device and an external server.

Figure 1:
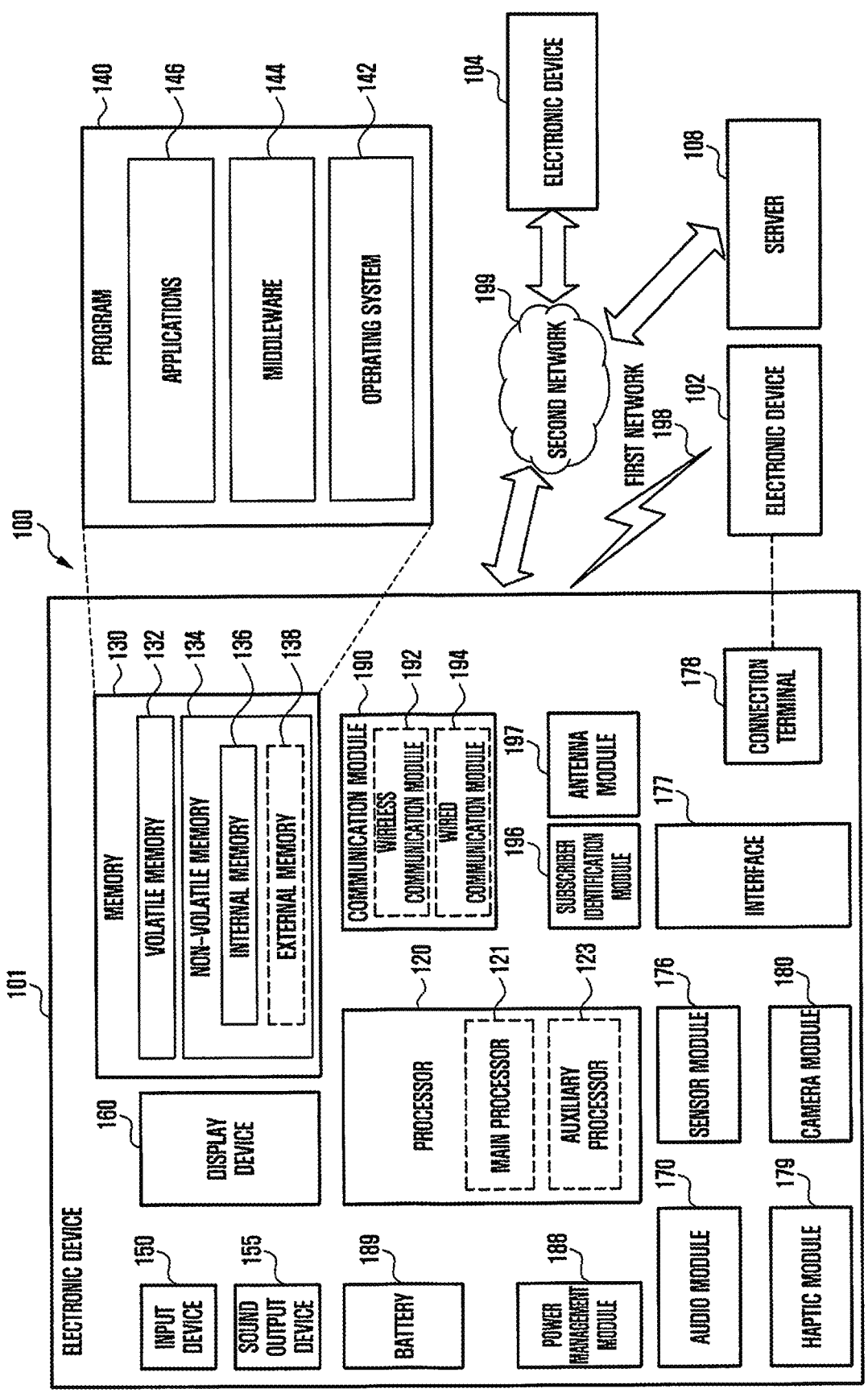
FIG. 1 is a block diagram illustrating an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), with an electronic device 104 or a server 108 via a second network 199 (e.g., a long-range wireless communication network), or with the electronic device 104 via the server 108, and may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in the volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101 and may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101, and may include a microphone, a mouse, a keyboard, or a digital pen (e.g., a stylus pen).

The sound output device 155 may output sound signals to the outside of the electronic device 101 and may include a speaker or a receiver. The speaker may be used for general purposes, such as playing multimedia or playing record, and the receiver may be used for incoming calls and may be implemented as separate from, or as part of the speaker.

The display device 160 may visually provide information to the outside (e.g., a user) of the electronic device 101 and may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa, and may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), and may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, ISPs, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 and may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., an RFIC) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. To that end, a cloud, distributed, or client-server computing technology may be used, for example.

Figure 2:
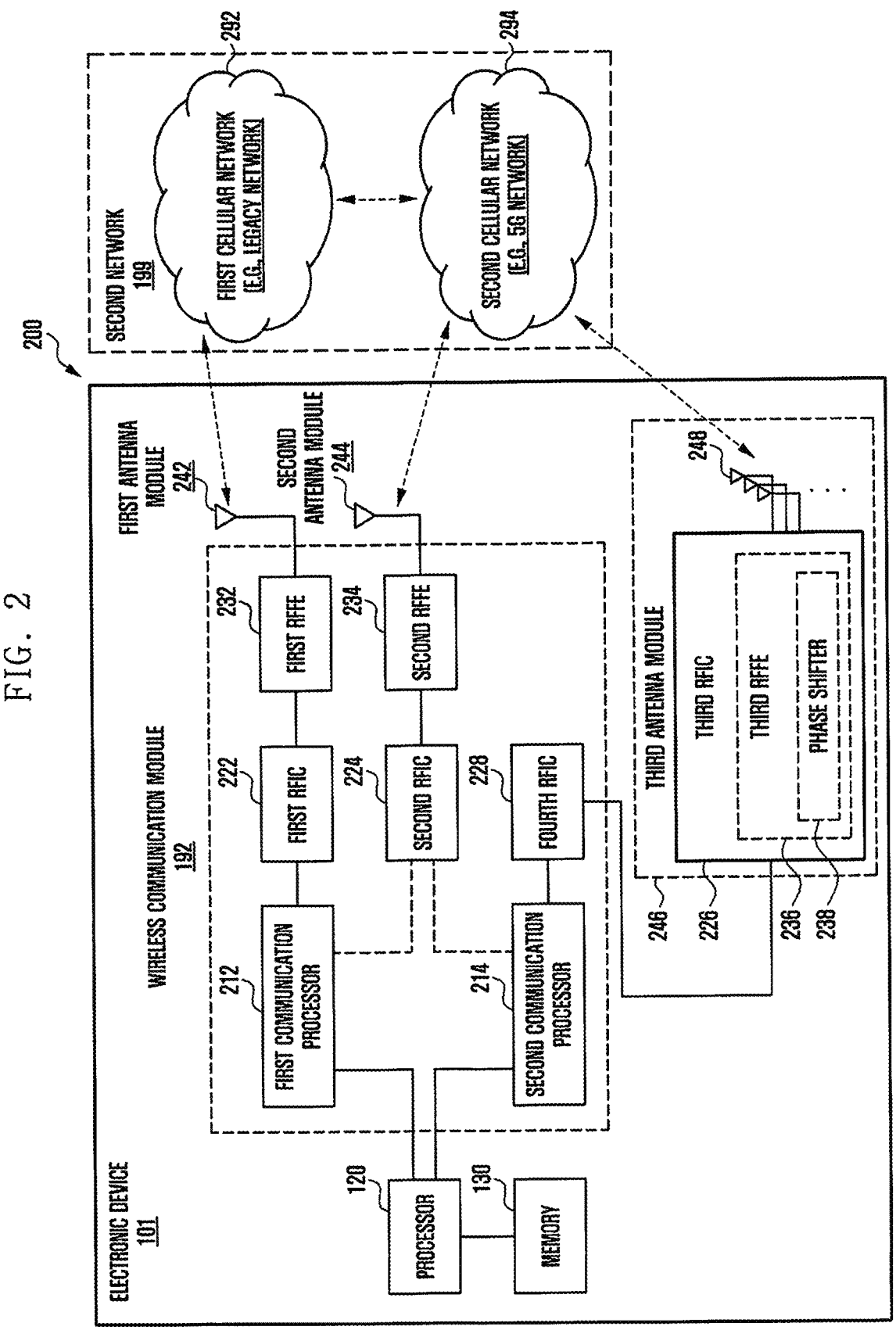
FIG. 2 is a block diagram of an electronic device supporting legacy network communication and fifth generation (5G) network communication according to an embodiment.

FIG. 2 illustrates an electronic device 101 for supporting legacy network communication and 5G network communication according to an embodiment.

Referring to FIG. 2, the electronic device 101 may further include a first CP 212, a second CP 214, a first RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130.

The network 199 may include a first network 292 and a second network 294. The electronic device 101 may further include at least one of the components shown in FIG. 1, and the network 199 may further include at least another network. The first CP 212, the second CP 214, the first RFIC 222, the second RFIC 224, the fourth RFIC 228, the first RFFE 232, and the second RFFE 234 may constitute at least a part of the wireless communication module 192. The fourth RFIC 228 may be omitted, or may be included as a part of the third RFIC 226.

The first CP 212 may establish a communication channel in a band to be used for wireless communication with a first network 292, and may support legacy network communication through the established communication channel. The first network may be a legacy network including a second generation (2G), third generation (3G), fourth generation (4G), or long-term evolution (LTE) network.

The second CP 214 may establish a communication channel corresponding to a designated band (e.g. from about 6 GHz to about 60 GHz) among bands to be used for wireless communication with a second network 294, and may support 5G network communication through the established communication channel. The second network 294 may be a 5G network defined in the third generation partnership project (3GPP).

Additionally, the first CP 212 or the second CP 214 may establish a communication channel corresponding to another designated band (e.g. about 6 GHz or less) among bands to be used for wireless communication with the second network 294, and may support 5G network communication through the established communication channel. The first CP 212 and the second CP 214 may be implemented in a single chip or a single package together with the processor 120, the auxiliary processor 123, or the communication module 190.

At the time of signal transmission, the first RFIC 222 may convert a baseband signal generated by the first CP 212 into a radio-frequency (RF) signal of about 700 megahertz (MHz) to about 3 GHz used for the first network 292 (e.g. a legacy network). At the time of signal reception, the RF signal may be acquired from the first network 292 (e.g. a legacy network) through an antenna (e.g. the first antenna module 242), and may be preprocessed through RFFE (e.g. the first RFFE 232). The first RFIC 222 may convert the preprocessed RF signal into a baseband signal which can be processed by the first CP 212.

At the time of signal transmission, the second RFIC 224 may convert a baseband signal generated by the first CP 212 or the second CP 214 into an RF signal (hereinafter, a 5G Sub6 RF signal) of a Sub6 band (e.g. about 6 GHz or less) used for the second network 294 (e.g. a 5G network). At the time of signal reception, the 5G Sub6 RF signal may be acquired from the second network 294 (e.g. a 5G network) through an antenna (e.g. the second antenna module 244), and may be preprocessed through RFFE (e.g. the second RFFE 234). The second RFIC 224 may convert the preprocessed 5G Sub6 RF signal into a baseband signal which can be processed by a corresponding CP among the first CP 212 and the second CP 214.

The third RFIC 226 may convert a baseband signal generated by the second CP 214 into an RF signal (hereinafter, a 5G Above6 RF signal) of a 5G Above6 band (e.g. from about 6 GHz to about 60 GHz) to be used in the second network 294 (e.g. a 5G network). At the time of signal reception, the 5G Above6 RF signal may be acquired from the second network 294 (e.g. a 5G network) through an antenna (e.g. the antenna 248), and may be preprocessed through the third RFFE 236. The third RFIC 226 may convert the preprocessed 5G Above6 RF signal into a baseband signal that can be processed by the second CP 214. The third RFFE 236 may be configured as a part of the third RFIC 226.

The electronic device 101 may include the fourth RFIC 228 separately from the third RFIC 226 or as at least a part thereof. In this instance, the fourth RFIC 228 may convert a baseband signal generated by the second CP 214 into an RF signal (hereinafter, an intermediate-frequency (IF) signal) of an intermediate frequency band (e.g. from about 9 GHz to about 11 GHz) and may then transmit the IF signal to the third RFIC 226. The third RFIC 226 may convert the IF signal into a 5G Above6 RF signal. At the time of signal reception, the 5G Above6 RF signal may be received from the second network 294 (e.g. a 5G network) through an antenna (e.g. the antenna 248) and may be converted into an IF signal by the third RFIC 226. The fourth RFIC 228 may convert the IF signal into a baseband signal that can be processed by the second CP 214.

The first RFIC 222 and second RFIC 224 may be implemented as at least a part of a single package or a single chip. The first RFFE 232 and the second RFFE 234 may be implemented as at least a part of a single package or a single chip. At least one antenna module of the first antenna module 242 or the second antenna module 244 may be omitted, or may be combined with the other antenna module to process RF signals of multiple bands corresponding thereto.

The third RFIC 226 and antenna 248 may be arranged on the same substrate to constitute a third antenna module 246. For example, the wireless communication module 192 or the processor 120 may be arranged on a first substrate (e.g. a main PCB). In this instance, the third antenna module 246 may be configured by arranging the third RFIC 226 in a partial area (e.g. a lower surface) of a second substrate (e.g. a sub PCB) independent of the first substrate and arranging the antenna 248 in another partial area (e.g. an upper surface) thereof. Arranging the third RFIC 226 and the antenna 248 on the same substrate can reduce the length of a transmission line therebetween, and may reduce the loss (e.g. attenuation) of a signal in a high-frequency band (e.g. about 6 GH-about 60 GHz), used for 5G network communication, by a transmission line. Therefore, the electronic device 101 may exhibit an enhanced quality or speed of communication with the second network 294 (e.g. a 5G network).

The antenna 248 may be configured as an antenna array including multiple antenna elements which can be used for beamforming. In this instance, the third RFIC 226 may include, as a part of the third RFFE 236, multiple phase shifters 238 corresponding to the multiple antenna elements. At the time of signal transmission, the multiple phase shifters 238 may shift the phases of 5G Above6 RF signals to be transmitted from the electronic device 101 to an external device (e.g. a base station of a 5G network) through antenna elements corresponding thereto. At the time of signal reception, the multiple phase shifters 238 may shift the phases of 5G Above6 RF signals received from the outside through antenna elements corresponding thereto into an identical or substantially identical phase, thus enabling the transmission or reception through beamforming between the electronic device 101 and the outside.

The second network 294 (e.g. a 5G network) may be operated independently of the first network 292 (e.g. a legacy network) (e.g. stand-alone (SA)) or may be operated while being connected to the first network (e.g. non-stand-alone (NSA)). For example, the 5G network may include only an access network (e.g. a 5G radio access network (RAN) or next-generation RAN (NG RAN)) and may not include a core network (e.g. a next-generation core (NGC)). In this instance, the electronic device 101 may access an access network of a 5G network and may then access an external network (e.g. Internet) under the control of a core network (e.g. an evolved packed core (EPC) network) of a legacy network. Protocol information (e.g. LTE protocol information) for communication with the legacy network or protocol information (e.g. new radio (NR) protocol information) for communication with the 5G network are stored in a memory 230, and may be accessed by another component (e.g. the processor 120, the first CP 212, or the second CP 214).

The electronic device 101 according to embodiments may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
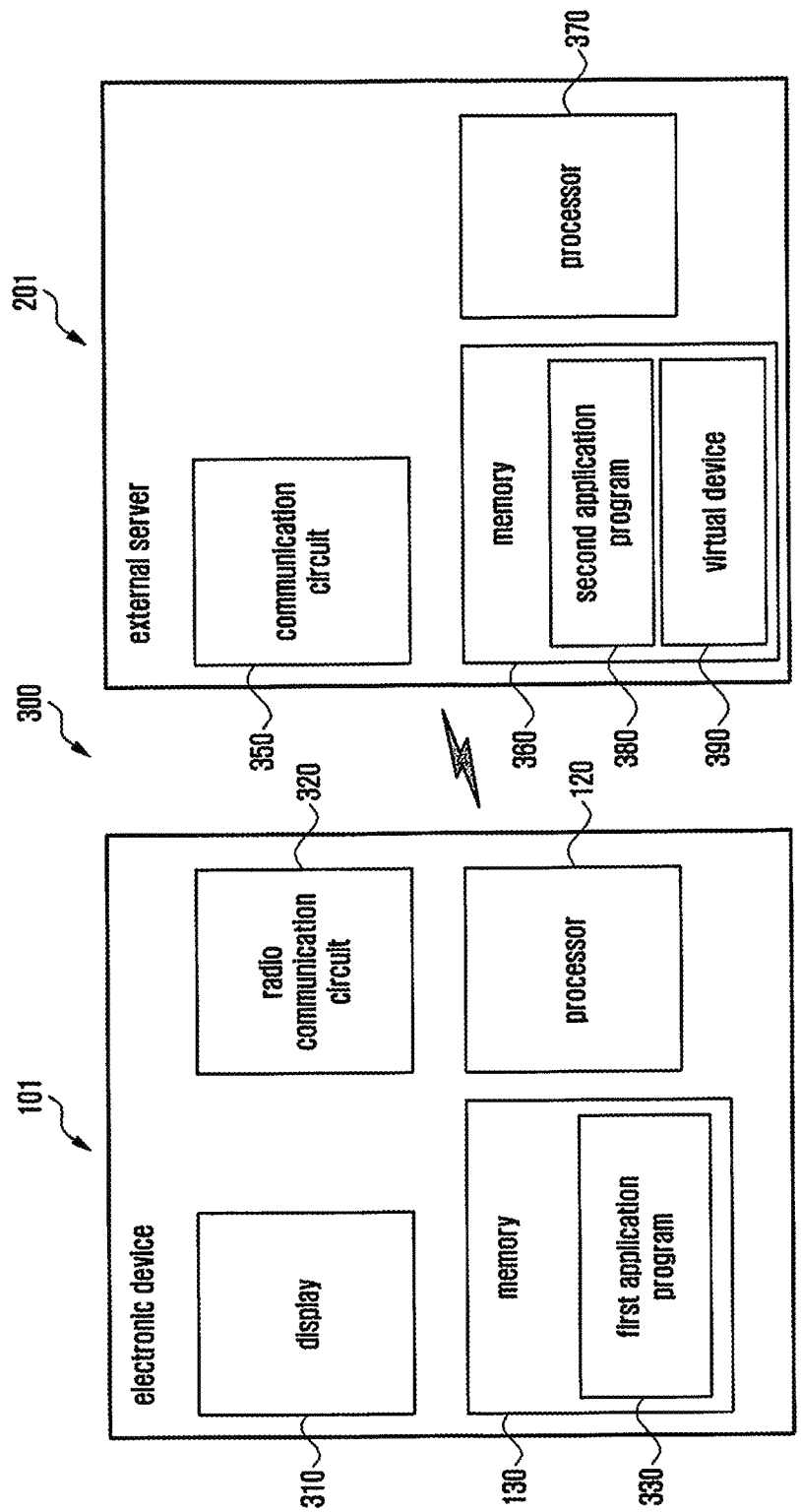
FIG. 3 is a block diagram illustrating a VMI-based application program execution network environment according to an embodiment.

FIG. 3 is a block diagram illustrating a VMI-based application program execution network environment 300 according to an embodiment.

Referring to FIG. 3, the VMI-based application program execution network environment 300 may include an electronic device 101 (e.g., a user device or a user terminal) and an external server 201 (e.g., a remote computing device, a mobile edge computing (MEC) server, a remote server, a cloud server, or a VMI module).

The electronic device 101 may include a processor 120, a memory 130, a display 310, and a radio communication circuit 320 (e.g., wireless communication module 192 in FIG. 1). The memory 130 may store an application program 330 (e.g., a first application program) running on the electronic device 101. The memory 130 is described below in greater detail with reference to FIG. 4.

The processor 120 of the electronic device 101 may communicate with the external server 201 through or within a network 199 and enable the VMI in the electronic device 101 based on a user's request. The VMI may include an environment for executing an application program 380 (e.g., a second application program) on the external server 201, which is identical at least partly in functionality with the first application program 330 running on the electronic device 101, and displaying an execution result of the second application program 380 running on the external server 201 on the display 301 of the electronic device 101. For example, the VMI may include an environment in which a virtual device 390 (or virtual machine) running on the external server 201 executes the second application program 380 substantially in the same manner as the electronic device 101 (e.g., a mobile device, a user terminal, or a desktop device) executes the first application program 330 and displays an execution result through the electronic device 101 or allows the electronic device 101 to remotely access the second application program 380 running on the external server 201. The virtual device running on the external server 201 may be implemented in software (e.g., a virtual desktop infrastructure) or include the software.

The processor 120 may receive various service profiles from the external server 201 via the radio communication circuit 320. The processor 120 may display an interface (e.g., a user interface (UI) or a graphical user interface (GUI)) for configuring a service profile (hereinafter, referred to as profile configuration interface) on the display 310. The processor 120 may receive a service profile selection signal input by a user via the profile configuration interface and transmit information on the service profile to the external server 201 via the radio communication circuit 320. The processor 120 may receive (e.g., streaming (e.g., downstream) of) an execution result (e.g., video and/or audio data (or information)) of the second application 380 running with the computing resources of the external server 201 (e.g., receive streaming), which are defined according to the service profile transmitted by the electronic device 101. The processor 120 may output the raw execution result received from the external server 201 or a processed (e.g., decoded) execution result to the user via an output device (e.g., the display 310 and/or a speaker).

The computing resources may include hardware resources for use by the virtual device 390 of the external server 201 in executing the second application program. For example, the hardware resources may include at least one processor 370 (e.g., an AP, a CPU, or a GPU) or a memory 360 (e.g., a storage device). Examples of the storage device may include a volatile memory for loading commands and/or data and a non-volatile memory for storing an application execution result of the virtual device 390. The virtual device 390 may execute the second application program 380 with allocated hardware resources. The computing resources may include network resources for use in communication between the external server 201 (or a network) and the electronic device 101. Examples of the network resources may include a type of the network (e.g., 3G, 4G, LTE, or 5G) and an upload and/or a downlink data limit (e.g., 5G, 40 GB+, unlimited 4G, or unlimited 5G) of the electronic device 101, or network service quality (quality of service (QoS)) (e.g., a data rate). The data rate may include frame per second (FPS), bandwidth, or latency. The external server 201 (e.g., the processor 370 of the external server 201) may control (or request to) the network to transmit the execution result of the virtual device 390 to the electronic device 101 using the network resources corresponding to the service profile selected by the electronic device 101.

The service profile may include information indicating the type and capability of available computing resources. For example, the service profile may include resource information of the virtual device 390 of the external server 201. The resource information may include at least one of a type or a number of processing devices associated with the second application program 380, a capacity and an input/output speed of the storage device (e.g., the memory 360), or a presence/absence and a type of an assigned graphic accelerator. In a case where the second application program 380 supports parallel processing, the resource information may include information indicating whether a task may be processed by multiple virtual devices 390 in a distributed manner. The service profile may include information indicating a billing plan (e.g., a monthly billing plan). The external server 201 may create multiple service profiles including different types and/or capabilities of available computing resources and proceed to provide the service profiles.

The processor 120 of the electronic device 101 may identify the first application program 330 that may be at least partly executable (served) by the external electronic device 201 among the application programs 140 installed in the electronic device 101. The first application program identification operation of the processor 120 may include requesting to the external server 201 an application list and receiving the application list containing the applications that may be executed on the external server 201. The processor 120 may transmit a list of the applications installed in the electronic device 101 in the operation of requesting the application list to the external server.

The processor 120 of the electronic device 101 may scan for available servers (e.g., external server 201). The processor 120 may scan for available servers based on designated time information (e.g., a designated time interval or a designated time point). The processor 120 may scan for available servers upon receipt of a user input for selecting an icon and/or an object (an indication) indicative of the first application program 330 or requesting the external server 201 to execute the second application program 380. Scanning for available servers may include discovering the external server 201. The processor 120 may scan for available servers while the first application program 330 is running. Scanning for available servers may include searching for a connectable external server per network (e.g., a base station) or a tracking area (TA) (e.g., by a unit of a base station group (or cell group) rather than a cell of a base station) when the electronic device 101 moves.

If the second application program 380 corresponding to the first application program 330 may be executed on the external server 201, the processor 120 of the electronic device 101 may display an object (or an indication) indicating execution availability on an icon of the first application program 330. The object (or the indication) may include a badge image in a shape of a cloud. The processor 120 may control to display the object on the icon of the first application program 330 in an overlapping manner such that the object is at least partially overlapped (or overlaid) on the icon.

The processor may control to receive a list of application programs executable by the external server 201 from the external server 201 and, if the second application program 380 corresponding to the first application program 330 is included in the application program list, display an object indicative thereof. The second application program 380 corresponding to the first application program 330 may include an application program executable instead of at least part of an operation of the first application program 330.

If the second application program 380 is authenticated by the external server 201 (e.g., for use of or access to the second application program 380), the processor 120 may display an object based on a response (e.g., an acknowledgement (ACK)) from the external server 201. The processor 120 of the electronic device 101 or the processor 370 of the external server 201 may identify a corresponding relationship between the first application program 330 and the second application program 380 based on unique information on the first application program 330 and the second application program 380 (e.g., an application identifier (AID)).

Whether the second application program 380 may be executed on the external server 201 may be determined based on environmental factors such as available resources of the external server 201 such as network status (e.g., latency and bandwidth) between the external server 201 and the electronic device 101. For example, whether the second application program 380 may be executed may be determined based on the computing resources. An object may be displayed to provide information on a status of the electronic device 101 such as a billing plan of the user and whether the application programs (e.g., the first application program 330 and the second application program 380) are synchronized.

In a case of executing the second application program 380 in the external server 201, the processor 120 of the electronic device 101 may synchronize data of the first application program 330 running on the electronic device 101 and data of the second application program 380 running on the external server 201. The data synchronization may be triggered by an event such as installing or executing an application program in the electronic device 101. For example, if any difference occurs between data of the application programs (e.g., the first application program 330 and the second application program 380) that are running on the electronic device 101 and the external server 201, respectively, this may trigger data synchronization.

The processor 120 of the electronic device 101 may detect (or receive) a user input made on an icon and/or object (or an indication) of the first application program 330 executable in the external server 201 and execute the first application program 330 on the electronic device 101 according to the user input or request the external server 201 execute the second application program 380 corresponding to the first application program 330 or provide (or display) a user interface (e.g., a context menu) for executing the second application program 380.

The processor 120 of the electronic device 101 may receive a first user input (a user input (e.g., a touch, a double touch, or a long touch) for executing the first application 330) made on the icon and/or object of the first application program 330. The processor 120 may execute the first application program 330 on the electronic device 101 or transmit a request for executing the second application program 380 corresponding to the first application program 330 to the external server 201 based on the first user input.

The processor 120 of the electronic device 101 may receive a second user input made on the icon and/or object of the first application program 330. The second user input may be a user input made in a different manner from that in which the first user input is made. For example, if the first user input is made with a touch gesture, the second user input may be made with a long touch gesture. The processor 120 may display a user interface (e.g., a context menu) associated with the first application program 330 based on the second user input. The user interface associated with the first application program 330 may be a user interface associated with the second application program 380 stored in the external server 201. For example, the user interface associated with the second application program 380 may include information indicating that the external server 201 has the second application program 380 corresponding to the first application program 330 of the electronic device 101 and a user interface providing a menu (or option) for executing or configuring the second application program 380 in the external server 201. The user interface (e.g., a context menu) may include a first item (e.g., remote execution (Run on Remote) or server execution (Run on Server)) and/or a second item (e.g., Remote configuration or Server configuration).

The first item (e.g., a remote execution item) in the user interface may be an item for selecting an environment in which the second application program 380 is executed. The second item (e.g., a remote configuration item) in the user interface may be an item for configuring an environment (e.g., a service profile) in which the second application program 380 is executed in a case of executing the second application program 380 in the external server 201. It may be possible to provide (or display) information (e.g., a third item) on gain obtained by executing the second application program 380 in the external server 201 in the user interface in order for the user to select an environment for executing the second application program 380 based on the provided information. For example, the processor 120 may provide a message such as "battery lifetime increases by 1 hour" or "response speed is 30 msec" in the user interface.

The processor 120 of the electronic device 101 may transmit information on the characteristics of the electronic device 101 to the external server 201 when a request is made to the external server 201 for executing the second application program 380. The processor 120 may transmit to the external server 201 the characteristic information (e.g., computing resources of the electronic device 101) such as a screen characteristic (e.g., resolution and color depth) and/or a hardware characteristic (e.g., types of supportable sensors, capability of the processor 120, or battery capacity) of the electronic device 101 or network characteristics (e.g., peak data rate and latency).

The processor 120 of the electronic device 101 may request the external server 201 to execute the second application program 380 and receive an execution result (e.g., video and/or audio data) of the second application program 380 running in the external server 201 from the external server via the radio communication circuit 320. The processor 120 may output the execution result (e.g., video and/or audio data) received from the external server 201 (e.g., downstream). The external server 201 may generate user-perceivable data (e.g., video data) by rendering the execution result (e.g., video (or screen) data) of the second application program 380 and transmit (stream) the generated data to the electronic device 101, which outputs the received data.

If the processor 120 of the electronic device 101 detects an event associated with the second application program 380 executed on the external server 201, the processor 120 may request the external server 201 to process the detected event. For example, the processor 120 may transmit (upstream) the detected event to the second application program 380 running in the external server 201. The processor 120 may detect an input event such as input information produced by a touchscreen (e.g., display device 160), a keyboard, or a physical key (e.g., input device 150), sensing information produced by various sensors (e.g., sensor module 176), speech input information produced by a microphone (e.g., input device 150), and captured image information produced by a camera (e.g., camera module 180) and an environmental change event such as illuminance information produced by an illuminance sensor, network signal strength information, location data information, or electronic device temperature information.

The processor 120 may detect an event related to context information of the electronic device 101 (e.g., receipt of an incoming call and function execution results of other application programs). The processor 120 may transmit the detected event to the external server 201 along with unique identity information (e.g., a device identity (DID), an international mobile equipment identity (IMEI), a temporary mobile subscriber identity (TMSI), and an international mobile station identity (IMSI)). The processor 120 may receive a processing result corresponding to the transmitted event from the external server 201.

The radio communication circuit 320 (e.g., wireless communication module 192 in FIG. 1) of the electronic device 101 may be configured to perform radio communication. The radio communication circuit 320 may be operationally connected to the processor 120 and establish a connection with the external server 201 in which the second application program 380 is executed to perform at least part of the operation of the first application program 330. The radio communication circuit 320 may transmit a request for executing the second application program 380 to the external server 201.

The display 310 of the electronic device 101 may display a user interface associated with the first application program 330 and/or the second application program 380. The display 310 may be operationally connected to the processor 120 and display a first user interface associated with the first application program 330 and/or a second user interface associated with the second application program 380. The display 310 may display data (e.g., video data) associated with the first application program 330 and/or the second application program 380. The display 310 may display an icon associated with the first application program 330 and an indication that is associated with the second application program 380 and at least partially overlapped with the icon of the first application program 330.

The external server 201 may communicate with the electronic device 101 via a network 199 and provide the electronic device 101 with VMI in response to a request from the electronic device 101. The external server 201 may be a cloud server residing in a base station of the network (e.g., first network 292 or second network 294) or a core network, for example, the external server 201 may be an MEC server residing in the base station (or access network) (e.g., first network 292 or second network 294 in FIG. 2). The MEC server may be located close to an edge (e.g., a base station (e.g., an eNodeB and a radio network controller (RNC))) of the network.

The external server 201 may include the processor 370, the memory 360, and a communication circuit 350. The memory 360 may store an application program 380 of the external server 201 and the virtual device 390. The second application program 380 may be an application program executing at least part of the operations of the first application program 330 of the electronic device 101. The memory 360 and the virtual device 390 stored in the memory are described below in greater detail with reference to FIG. 4.

The processor 370 of the external server 201 may assign the virtual device 390 to the electronic device 101 (e.g., a resource configuration) based on the service profile selected by the electronic device 101 and execute the assigned virtual device 390. For example, the virtual device 390 may include a software program (e.g., a virtual device interface (VDI)) being executed by at least one processor 370 of the external server 201. The processor 370 may control the virtual device 390 to execute the second application program 380 using the computing resources indicated by the service profile selected by the electronic device 101. The processor 370 may control the communication circuit 350 to transmit (stream) an execution result (e.g., audio and/or video data (or information)) of the second application program 380 to the electronic device 101.

The processor 370 of the external serve 201 may determine computing resources (e.g., hardware resources) per the second application program 380. The processor 370 may determine the computing resources (e.g., network resources) required for transmitting the execution result of the second application program 380 to the electronic device 101. For example, the processor 370 may determine at least one of computing resources required for recommended specifications and optimum specifications based on a statistically collected hardware service quality (e.g., a runtime and/or a network service quality (e.g., a latency)) per the second application 380.

The processor 370 of the external server 201 may control the virtual device 390 to execute the second application program 380 with the selected computing resources and determine the recommended specifications and optimum specifications that are required for executing the second application program 380 based on the statistical data per the second application program 380 in association with a data rate (e.g., an FPS) acquired in executing the second application program 380. For example, the statistical data may include a latency as a metric indicative of a service quality of the network resources.

Latency may be defined as a time interval between a first point in time when a source (e.g., the external server 201) transmits a data packet to a destination (e.g., the electronic device 101) and a second point in time when the packet arrives at the destination (e.g., the electronic device 101). The second point in time may be perceived by the source based on a response (e.g., an ACK) from the destination of the packet. As another example, latency may be defined by adding a time it takes a packet (e.g., an ACK transmitted by a destination upon receipt of the packet transmitted by the source) to arrive at the source. The statistical data may include a runtime as a metric indicative of the hardware resource service quality. The external server 201 may determine the recommended specification and optimum specifications that are required for executing the second application program 380 in consideration of the runtime.

The processor 370 of the external server 201 may transmit information (e.g., status information) on the second application program 380 to the electronic device 101 based on the computing resources corresponding to the service profile selected by the electronic device 101.

The processor 370 of the external server 201 may receive a request for executing the second application program 380 from the electronic device 101 and allocate (or configure) resources for executing the second application program 380 based on the service profile (e.g., a service profile configured by the user or set as a default) in response to the execution request.

The processor 370 of the external server 201 may execute the second application program 380 in an environment that is substantially identical with a last environment in which the first application program 330 was operating in the electronic device 101 using the data pre-synchronized with the electronic device 101 (or the first application program 330).

The processor 370 of the external server 201 may receive a request for executing the second application program 380 along with information on the characteristic of the electronic device 101 (or computing resources of the electronic device 101) from the electronic device 101 via the communication circuit 350. The processor 370 may configure (or assign) the virtual device 390 appropriate for the electronic device 101 (or the second application program 380) based on at least one of the device characteristic information of the electronic device 101, network characteristic information, or service profile.

The processor 370 of the external server 201 may control the communication circuit 350 to transmit an execution result (e.g., video and/or audio data) of the second application program 380 running in the external server 201 to the electronic device 101. The processor 370 may receive an event associated with the second application program 380 from the electronic device 101 while the second application program 380 is running in the external server 201, perform (or process) a function of the second application program 380 in the same context as that of the electronic device 101 based on the received event, and generate an execution result and proceed to transmit the execution result to the electronic device 101.

The communication circuit 350 of the external server 201 may be configured to perform radio communication. The communication circuit 350 may be operationally connected to the processor 370 and establish a connection to the electronic device 101 including the first application program 330. The communication circuit 350 may receive a request for executing the second application program 380 corresponding to the first application program 330 from the electronic device 101. The communication circuit 350 may transmit an execution result (e.g., video and/or audio data) of the second application program 380 to the electronic device 101.

Figure 4:
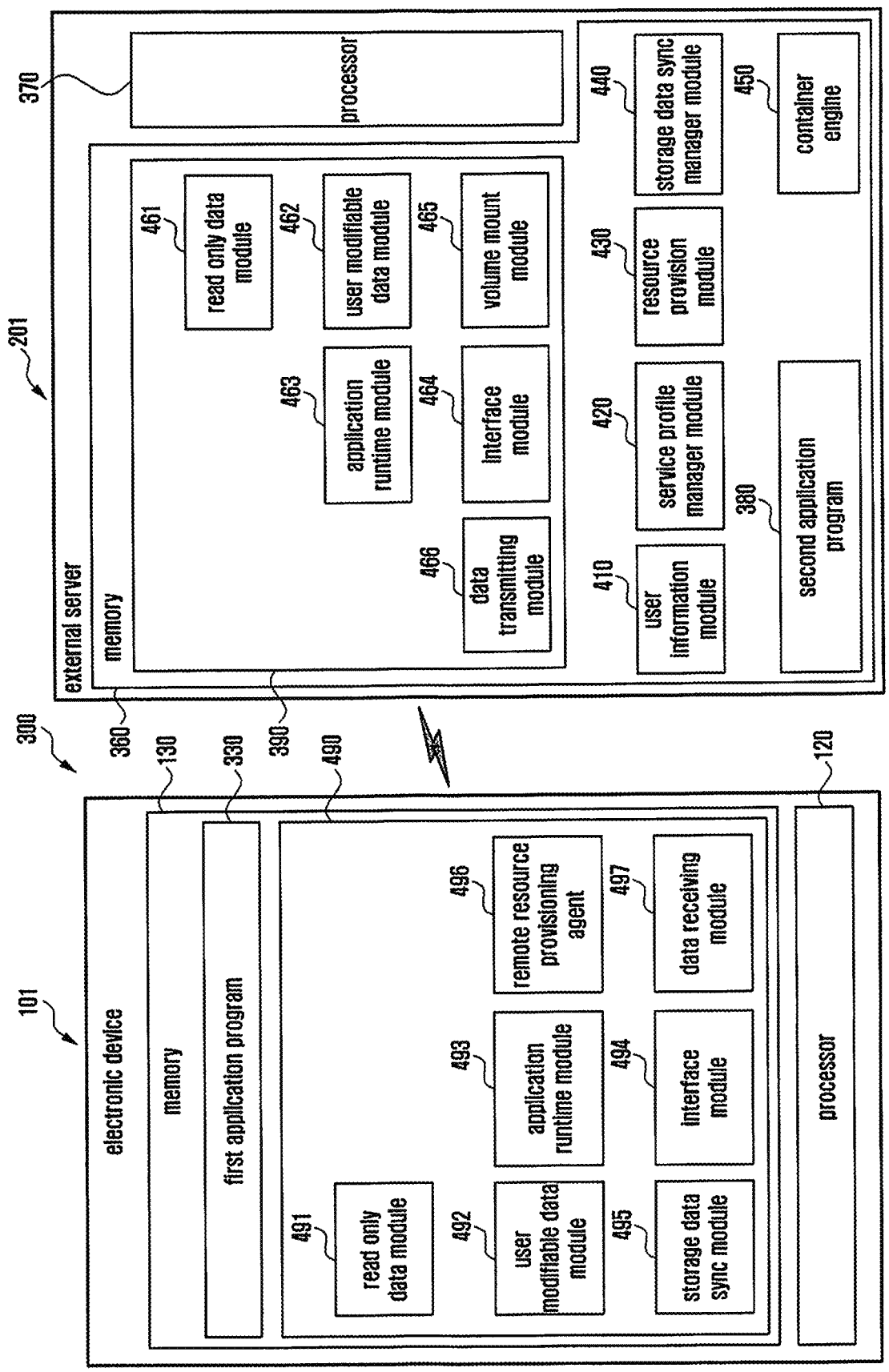
FIG. 4 is a block diagram illustrating a network environment for executing an application program based on VMI according to an embodiment.

FIG. 4 is a block diagram illustrating a network environment 300 for executing an application program based on VMI according to an embodiment.

Referring to FIG. 4, the network environment 300 may include an electronic device 101 and an external server 201.

The electronic device 101 and the external server 201 may be at least partly identical in configuration with the electronic device 101 and the external server 201 in FIG. 3, respectively.

In FIG. 4, the electronic device 101 may include a processor 120 and a memory 130. The memory 130 may store an application program 330 running on the electronic device 101 (e.g., a first application program) and a virtual module 490 for executing an application program 380 (a second application program) in the external server 201 (e.g., remote execution, virtual machine-based (VDI-based) execution, or virtualized execution), where the second application program 380 corresponds to the first application program 330. The virtual module 490 may be implemented in software such as commands (e.g., a VDI) or include software. The virtual module 490 may be stored in the memory 130 and executed by the processor 120.

The first application program 330 may include an application program installed in a host operating system (OS) of the electronic device 101, the virtual module 490 (e.g., a virtual machine or a client OS) virtualized in the host OS, or a container including a runtime module 493.

The second application program 380 may be an application program installed in a host OS of the external server 201, a virtual device 390 (e.g., a virtual machine or a client OS) virtualized in the host OS, or a container (e.g., a container engine 450) including a runtime module 463.

The second application program 380 corresponding to the first application program 330 may execute at least part of the operations of the first application program 330.

The virtual module 490 of the electronic device 101 may include a read only data module 491, a user modifiable data module 492, the application runtime module 493, an interface module 494, a storage data synchronization (sync) module 495, a remote resource provisioning agent 496, and a data receiving module 497. However, the virtual module 490 is not limited thereto and may be configured with at least some of the components being combined or other additional components.

The read only data module 491 may manage persistent data that is stored, when the first application program 330 is installed in the memory 130 such as an execution program of the first application program 330 and unique resource files that are used by all users in common. The persistent data may be stored in the memory 130.

The user modifiable data module 492 may manage per-user modifiable data of the first application program 330 and store the per-user modifiable data in the memory 130.

The application runtime module 493 may configure an environment for executing the first application program 330. The application runtime module 493 may configure a Java virtual machine (VM) and OS (e.g., Android™ and Linux™) libraries and/or system services.

The interface module 494 (e.g., a device interface sync layer) may transmit user input information (e.g., touch information and sensor information) and/or unique identity information of the electronic device 101 to the external server 201. The interface module 494 may transmit the user input information to the external server 201 for executing the user input on the virtual device 390 of the external server 201.

The storage data sync module 495 may synchronize data associated with the first application program with the external server 201.

Data synchronization may be triggered by an event such as installing or executing an application program in the electronic device 101. Data synchronization may be triggered by an event such as an output of an execution result (e.g., data) of the second application program 380 in the external server 201 (e.g., the virtual device 390). Data synchronization may be triggered by a designated interrupt (e.g., a designated time and a designated operation (e.g., saving or termination)) while the second application program 380 is running in the external server 201.

For example, the storage data synchronization module 495 may perform synchronization upon an occurrence of a difference between data of the respective application programs (e.g., first application program 330 and second application program 380) that are running on the electronic device 101 and the external server 201.

The storage data synchronization module 495 may receive synchronization data from the external server 201 and store the received data in the memory 130. The storage data synchronization module 495 may manage data associated with the first application program 330 of the electronic device 101. For example, the data associated with the first application program 330 may be generated in response to a user input or as a result of executing the first application program 330, stored in the memory 130, and managed by the storage data synch module 495.

The remote resource provisioning agent 496 may process an execution request for executing the second application program 380 in the external server 201, where the second application program 380 corresponds to the first application program 330. The remote resource provisioning agent 496 may request the external server 201 to allocate computing resources based on a service profile (e.g., a service profile configured by the user or set as a default) (e.g., computing resources defined in the service profile (e.g., 16 CPUs, 128 gigabyte (GB) memory, and 64 GB storage) along with the request for executing the second application program 380.

The data receiving module 497 (e.g., a network frame buffer) (e.g., including a decoder) may receive the execution result (e.g., video and/or audio data stream) of the second application program 380 running on the external server 201.

The electronic device 101 may include an output device (e.g., display 310 and a speaker (e.g., the sound output device 155)) for outputting data (e.g., video and/or audio data) generated by the first application program 330 or the second application program 380 and a radio communication circuit (e.g., 320 configured for radio communication with the external server 201.

The external server 201 may include a processor 370 and a memory 360. The memory 360 may store the second application program 380 corresponding to the first application program 330 of the electronic device 101, a virtual device 390 for executing the second application program 380 in the external server 201, a user information module 410, a service profile manager module 420, a resource provision module 430, a storage data sync manager module 440, and the container engine 450.

The processor 370 and the memory 360 are computing resources that may be used by a virtual device 390 (or virtual machine) (e.g., software (VDI) implementation or software installed in the virtual machine). For example, the processor 370 may be operatively connected to the modules 410 to 450 and the virtual device 390. The processor 370 may include one or more processors. The memory 360 may be operatively connected to the processor 370. The memory 360 may be configured to store instructions including the modules 410 to 450 and the virtual device 390 to be executed by at least one of multiple processors, application programs (e.g., second application program 380) to be executed by the virtual device 390, and execution results of the application programs.

The user information module 410 may store basic information of a user (e.g., user (subscriber) information received from the electronic device 101) in the memory 360.

The service profile manager module 420 may manage the types and/or capabilities of the available computing resources in the form of service profiles (e.g., creating, modifying, and update service profiles) based on the per-user information. The user information may include information on a subscribed operator and/or a billing plan in use (e.g., type of network or available data limit).

The service profile manager module 420 may change (e.g., add or delete) the type of computing resources and adjust corresponding capabilities of the computing resources according to a user's request. The service profile manager module 420 may provide the electronic device 101 with multiple service profiles (e.g., service profiles different in types of available computing resources and/or capabilities) and receive information on a selected service profile from the electronic device 101. The service profile manager module 420 may perform billing for use of the computing resources.

The service profile manager module 420 may define service profiles with types and/or capabilities of computing resources available per user (or electronic device 101) and authenticate a user right (plan) for the type and/or capability of the computing resources requested by the user (or electronic device 101).

The resource provision module 430 may control executing a virtual device (e.g., virtual device 390) based on the selected service profile. The resource provision module 430 may check for the type and/or capability of the computing resources defined with the service profile selected by the electronic device 101 via the service profile manager module 420 and allocate the computing resources of the checked type and/or capability to one of the virtual devices 390 (e.g., a virtual device not in use) in order for the virtual device 390 to execute the second application program 380.

The storage data synchronization manager module 440 may synchronize data between the application programs (e.g., the first application program 330 of the electronic device 101 and the second application program 380 running in the external server). Data synchronization may be triggered by an event such as installing or executing the first application program 330 in the electronic device 101.

Data synchronization may be triggered by an event such as an output of an execution result (e.g., data) of the second application program 380 in the external server 201 (e.g., the virtual device 390). Data synchronization may be triggered by a designated interrupt (e.g., a designated time and a designated operation (e.g., saving or termination)) while the application program (e.g., the first application program 330 or the second application program 380) is running.

For example, the storage data synchronization manager module 440 may perform synchronization upon an occurrence of a difference between data of the respective application programs 330 and 380 that are running on the electronic device 101 and the external server 201. The storage data synchronization manager module 440 may receive synchronization data from the electronic device 101, and the received data is managed by the user modifiable data module 462 and stored in the memory 360.

The storage data synchronization manager module 440 may manage the data stored in the memory 360. For example, the data may be the data that is generated based on the user input received by the virtual device 390 from the electronic device 101 or as an execution result of the second application program 380, stored in the memory 360 (e.g., a non-volatile memory), and managed by the storage data synchronization manager module 440. For example, the storage data synchronization manager module 440 may preserve the data received from the electronic device 101 and delete the data after a predetermined time elapses. As another example, the storage data synchronization manager module 440 may check for the allocation amount of the memory 360 (e.g., a non-volatile memory) as defined in the corresponding service profile and, if the preserved user data amount exceeds the memory allocation amount, delete part of the preserved data automatically or under the confirmation of the user (e.g., delete preserved data in an oldest first manner or selected by the user).

The container engine 450 (or virtual engine (VE)) may allocate computing resources necessary for the virtual device 390 in the external server 201 and provide an environment for executing the virtual device 390 with the independent computing resources. The container engine 450 may include a hypervisor (e.g., software enabling different OSs to run in the external server 201) executing the virtual device 390 and a container for the OS per process.

The virtual device 390 may execute the application program (e.g., the second application program 380) with the allocated computing resources. The virtual device 390 may be implemented with one or more software modules (e.g., software modules installed in the virtual machine). For example, the virtual device 390 may be implemented as multiple devices, e.g., virtual devices including a first virtual device, a second virtual device, and a third virtual device. The first virtual device may execute an application program using the computing resources defined in a first service profile, the second virtual device may execute an application program using the computing resources defined in a second service profile, and the third virtual device may execute an application program using the computing resources defined in a third service profile.

The first to third service profiles may be selected by the same electronic device 101 for executing different application programs. For example, the first to third service profiles may be identical to each other and, in this case, the first to third virtual devices may execute different application programs using the same computing resources. As another example, the first to third service profiles may differ from each other and, in this case, the computing resources allocated to the first to third virtual devices may differ in capability and/or type. For example, the computing resources that the external server 201 allocates to the first and second virtual devices may differ in at least one of type of processor, number of processors, volatile memory allocation amount, non-volatile memory allocation amount, and bandwidth. That is, the virtual devices may execute different application programs with different capabilities.

The first to third service profiles may be selected by different electronic devices for executing the same application program (or different application programs). For example, the first and second electronic devices may select the same service profile (or different service profiles) to execute the same application program (or different application programs) using the same (or different) computing resources simultaneously (or at different times).

The virtual device 390 may include a read only data module 461, a user modifiable data module 462, the application runtime module 463, an interface module 464, a volume mount module 465, and a data transmitting module 466.

The read only data module 461 may manage persistent data that is stored, when the second application program 380 is installed, in the memory 360 such as an execution program of the second application program 380 and unique resource files that are used by all users in common. The persistent data may be stored in the memory 360.

The user modifiable data module 462 may manage per-user modifiable data of the second application program 380 and store the per-user modifiable data in the memory 360.

The application runtime module 463 may configure an environment for executing the second application program 380. The application runtime module 463 may configure a Java virtual machine (VM) and OS (e.g., Android™ and Linux™) libraries and/or system services.

The interface module 464 (e.g., a device interface sync layer) may send user input information (e.g., touch information and sensor information) and/or unique identity information received from the electronic device 101 to other components (e.g., read only data module 461) of the virtual device 390. Accordingly, the virtual device 390 may execute a function and/or a service of the second application program 380 using the allocated computing resources based on the received user input information.

The volume mount module 465 may generate a volume for maintaining the data of the second application program and mount the volume on other components (e.g., read only data module 461 and user modifiable data module 462). The volume mount module 465 may mount the user data on the same location (e.g., a folder and a file) while the second application program 380 is running.

The data transmitting module 466 (e.g., a network frame buffer) (e.g., including an encoder) may transmit (stream) an execution result (e.g., video and/or audio data) of the second application program 380 executed by the virtual device 390 to the electronic device 101.

The external server 201 may further include a billing policy module for determining a billing for use of the computing resources defined in the service profile, an instance manager module for storing and managing information necessary for the operation of the virtual device 390, and a communication circuit (e.g., a radio communication circuit) configured for radio communication with the electronic device 101.

According to an embodiment, the electronic device includes a display, a radio communication circuit configured for radio communication, at least one processor operatively connected to the display and the radio communication circuit, and a memory operatively connected to the processor and configured to store a first application program including a first user interface, where the memory stores instructions, executable by the at least one processor, for establishing a connection to an external server including a second application program executing at least part of operations of the first application program, executing, upon receipt of a first user input related to the first application program, the first application program to display the first user interface of the first application program, and displaying, upon receipt of a second user input related to the first application program, a second user interface related to the second application program on the display.

The instructions include an instruction, executable by the processor, for receiving information indicative of inclusion of the second application program in the external server during or after establishing the connection to the external server.

The instructions include an instruction, executable by the processor, for displaying an icon related to the first application program and an indication related to the second application program and at least partly overlapped with the icon on the display.

The instructions include an instruction, executable by the processor, for receiving the first user input via the icon and/or the indication.

The instructions include an instruction, executable by the processor, for receiving the second user input via the icon and/or the indication.

The instructions include instructions, executable by the processor, for receiving a third user input via the second user interface and transmitting to the external server a request for executing the second application program in the external server via the radio communication circuit based on at least part of the third user input.

The instructions include an instruction, executable by the processor, for synchronizing first data of the first application program of the electronic device with second data of the second application program of the external server.

The instructions include instructions, executable by the processor, for executing the first application program in the electronic device, scanning for the external server that is capable of executing the first application program while the first application program is running, and displaying an object for executing the second application program on the display based a result of scanning for the external server.

The instructions include instructions, executable by the processor, for receiving a user input made on the object and displaying a user interface including status information on executing the second application program on the display based on the user input.

The instructions include an instruction, executable by the processor, for establishing a connection to the external server residing in a base station or located in a core network connected to the base station.

Figure 5:
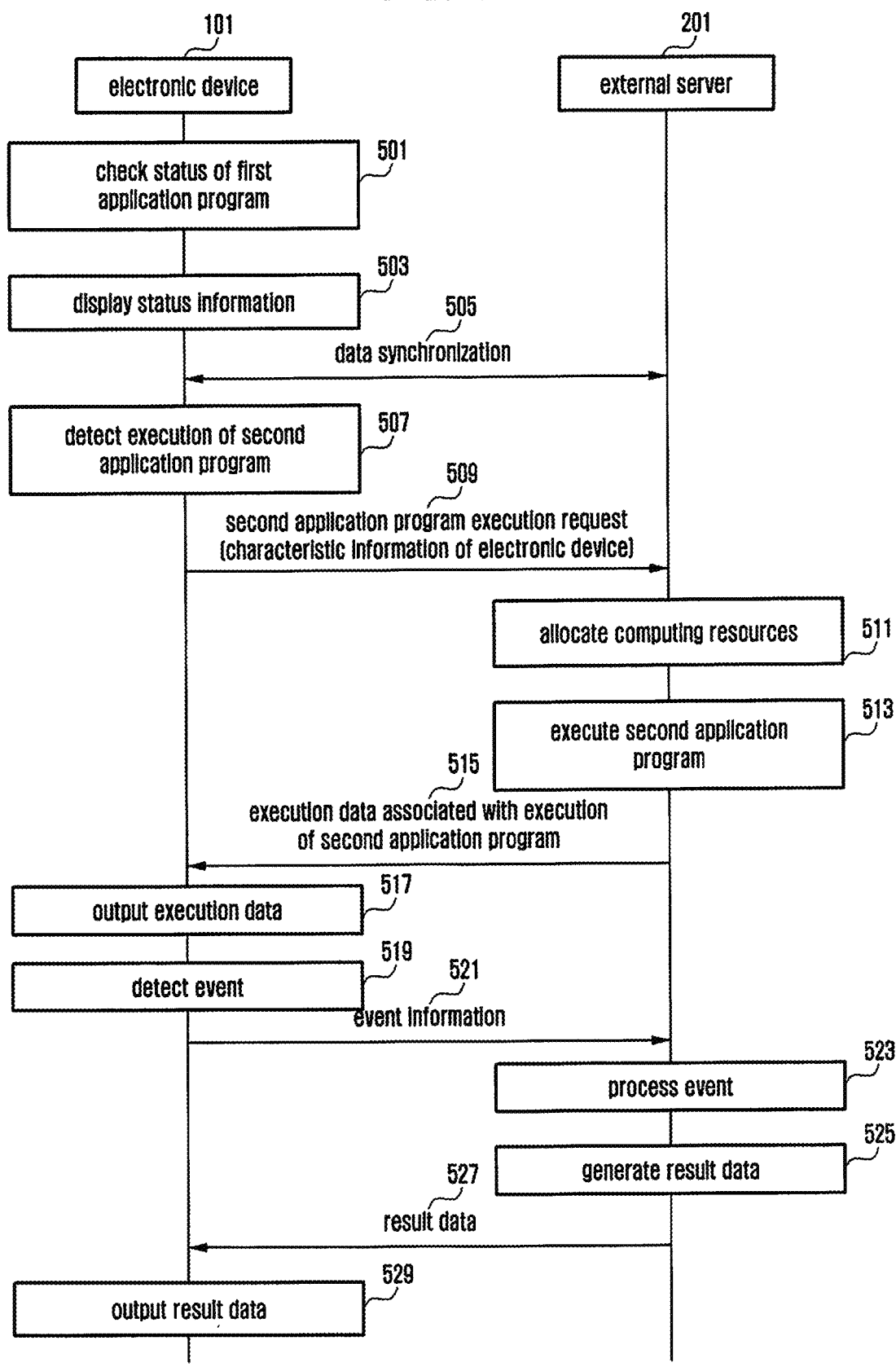
FIG. 5 is a signal flow diagram illustrating operations between an electronic device and an external server according to an embodiment.

FIG. 5 is a signal flow diagram illustrating operations between an electronic device 101 and an external server 201 according to an embodiment.

Referring to FIG. 5, the operations of the electronic device 101 may be carried out by at least one processor 120 (including a processing circuit) of the electronic device 101, which executes instructions stored in the memory 130. The operation of the external server 201 may be carried out by at least one processor 370 (including a processing circuit) of the external server 210, which executes instructions stored in the memory 360.

The electronic device 101 may check for a state of an application program (e.g., the first application program 330) at step 501. The electronic device 101 may scan for the external server 201 and determine whether the external server 201 is capable of executing the application program. The electronic device 101 may check whether the external server 201 can execute an application program (e.g., the second application program 380) corresponding to at least one application program (e.g., the first application program 330) installed in the electronic device 101 (e.g., execute virtualization).

When an application program (e.g., the first application program 330) is installed in the electronic device 101, the electronic device 101 may check whether the external server 201 can execute an application program (e.g., the second application program 380) in association with the first application program 330. The electronic device 101 may receive (or detect) a user input for executing the first application program 330 in the external server 210, where the first application program 330 may check whether the second application program 380 corresponding to the first application program 380 is executable in the external server 201.

Checking for the state of the first application program 330 may include determining whether the first application program 330 is an application program replaced by the second application program 380 running on the external server 201 (e.g., a hybrid application program executable by the electronic device 101 or the external server 201 or a virtualization application executed by only the external server 201). For example, checking for the state of the first application program 330 may be performed on the hybrid application program.

At step 503, the electronic device 101 may display state information. If it is determined that the second application program 380 corresponding to the first application program 330 is executable by the external server 201, the electronic device 101 may display a designated object (or indication) (e.g., a badge image in a shape of cloud) on an icon of the first application program 330. The electronic device 101 may display the object such that the object is at least partly overlapped (or overlaid) with the icon of the first application program 330.

The electronic device 101 may receive a list of application programs executable in the external server 201 from the external server 201 and, if the application program list contains the first application program 330, display an object indicative thereof. If the external server 201 completes authentication on the first application program 330, the electronic device 101 may display an object based on a response (e.g., an ACK) from the external server 201. The electronic device 101 or the external server 201 may identify a corresponding relationship between the application programs based on unit information on the application program (e.g., an AID).

How to display the object on the icon is described below with reference to accompanying drawings. Whether an application program is executable in the external server 201 may be determined based on a network state (e.g., a latency and a bandwidth) between the external server 201 and the electronic device 101 and an environmental factor such as a state of available resources of the external server 201. For example, the application executability may be determined based on computing resources.

At step 505, the electronic device 101 may perform data synchronization between the respective application programs (e.g., the first application program 330 and the second application program 380) that are running on the electronic device 101 and the external server 201. If there is any difference between data of the application programs (e.g., first data of the first application program 330 stored in the electronic device 101 and second data of the second application program 380 stored in the external server), the electronic device 101 and the external server 201 may perform data synchronization.

At step 507, the electronic device 101 may detect execution of an application program (e.g., the second application program 380). The electronic device 101 may receive a user input made on the icon of the first application program 330 and/or the object (or indication) and execute the first application program 330 on the electronic device 101 or the second application program 380 on the external server 201 in response to the user input, where the second application program 380 corresponds to the first application program 330.

The electronic device 101 may receive a first user input (e.g., a touch, a double touch, and a long touch) made on the icon of the first application program 330 and/or the object. The electronic device 101 may execute the first application program 330 based on the first user input, where the first application program 330 runs on the electronic device 101.

The electronic device 101 may receive a second user input made on the icon of the first application program 330 and/or the object. The second user input may be a user input made in a manner different from that in which the first user input is made. For example, if the first user input is made with a touch gesture, the second user input may be made with a long touch gesture. The electronic device 101 may display a user interface (e.g., a context menu) associated with the second application program 380 of the external server 201 based on the second user input, where the second application program 380 corresponds to the first application program 330.

The user interface associated with the second application program 380 may be a user interface related to the second application program 380 stored in the external server 201. For example, the user interface associated with the second application program 380 may include information indicating that the external server 201 has the second application program 380 corresponding to the first application program 330 of the electronic device 101 and a user interface providing a menu (or option) for executing or configuring the second application program 380 in the external server 201.

The electronic device 101 may determine whether the second application program 380 can be executed on the external server 201 based on a third user input for selecting an item provided in the user interface (e.g., a context menu) for executing the second application program 380 in the external server 201.

At step 509, the electronic device 101 may transmit a request for executing the second application program 380 to the external server 201. For example, the electronic device 101 may transmit to the external server 201 the request for executing the second application program 380 stored in the second external server 201. The electronic device 101 may transmit characteristic information indicative of various characteristics of the electronic device 101 to the external server 201 along with the request for executing the second application program 380. The characteristic information of the electronic device 101 may include a screen characteristic (e.g., resolution and color depth) and/or a hardware characteristic (e.g., types of supportable sensors, capability of the processor 120, or battery capacity) of the electronic device 101 or network characteristics (e.g., peak data rate and latency).

The electronic device 101 may transmit to the external server 201 a selected service profile (e.g., a profile configured by the user or set as a default) when requesting execution of the second application program 380. The service profile may include information indicating a type and/or capability of available computing resources. For example, the service profile may include resource information associated with a virtual device 390 of the external server 201. The resource information included in the service profile may include information on a type and number of processing devices, a size and input/output speed of a storage device (e.g., a memory), and presence/absence and a type of an assigned graphic accelerator that is required for the second application program 380.

At step 511, the external server 201 may allocate computing resources for the second application program 380 based on the request for executing the second application program 380. The external server 201 may allocate the computing resources based on the service profile received from the electronic device 101. For example, the external server 201 may allocate (or configure) resources for executing the second application program 380 based on the service profile (e.g., a service profile configured by the user or set as a default) according to the request for executing the second application program 380 from the electronic device 101.

The computing resources may include hardware resources for use by the virtual device 390 of the external server 201 in executing the second application program 380. For example, the hardware resources may include at least one processor (e.g., an AP, a CPU, or a GPU) or storage device. For example, the storage device may include a volatile memory for loading commands and/or data or a non-volatile memory for storing a processing result of the virtual device.

The computing resources may include network resources for use in communication between the external server 201 and the electronic device 101. For example, the network resources may include a type of the network (e.g., 3G, 4G, LTE, or 5G) and an upload and/or downlink data limit (e.g., 5G, 40 GB+, unlimited 4G, or unlimited 5G) of the electronic device 101, or a network service quality (QoS) (e.g., data rate). The data rate may include FPS, bandwidth, or latency.

At step 513, the external server 201 may execute the second application program 380. The external server 201 may configure (or assign) a virtual device appropriate for the electronic device 101 (or the second application program 380) based on at least one of the characteristic information of the electronic device 101, the characteristic information of the network, or the service profile and execute the second application program 380 using the hardware resources allocated to the corresponding virtual device. The external server 201 may execute the second application program 380 in an environment that is substantially identical with the last environment in which the first application program 330 was operating in the electronic device 101 using the data pre-synchronized with the electronic device 101 (or the first application program 330).

At step 515, the external server 202 may transmit execution data (e.g., audio and/or video data (or information)) related to the execution of the second application program 380 to the electronic device 101. The external server 201 may transmit (stream) to the electronic device 101 an output (e.g., audio and/or video data) acquired as an execution result of the second application program 380 executed using the computing resources defined in the service profile transmitted by the electronic device 101.

At step 517, the electronic device may receive the execution data transmitted by the external server 201 and output the received execution data. The electronic device 101 may output the execution data, as the execution data are received or after the execution data are additionally processed, to the user via an output device (e.g., a display and/or a speaker).

At step 519, the electronic device 101 may detect an event. For example, the electronic device 101 may detect an event based on input data produced by a touch gesture or an input device such as a sensor and camera. The electronic device 101 may detect an input event such as input information produced by a touchscreen (e.g., display device 160), a keyboard, or a physical key (e.g., input device 150), sensing information produced by various sensors (e.g., sensor module 176), speech input information produced by a microphone (e.g., input device 150), and captured image information produced by a camera (e.g., camera module 180). The electronic device 101 may detect an environmental change event such as illuminance information produced by an illuminance sensor, network signal strength information, location data information, or electronic device temperature information. The electronic device 101 may detect an event related to context information (e.g., receipt of an incoming call and function execution results of other application programs).

At step 521, the electronic device 101 may transmit event information related to the detected event to the external server 201. The electronic device 101 may detect an event related to the second application program 380 executed on the external server 201 and request the external server 201 to process the event. For example, the electronic device 101 may transmit (upstream) the detected event to the second application program 380 running on the external server 201. The event information may be transmitted to the external server 201 along with unique identity information of the electronic device 101.

At step 523, the external server 201 may process the event indicated by the event information received from the electronic device 101. The external server 201 may perform a computation required according to the event information. The external server 201 may receive the event information associated with the second application program 380 from the electronic device 101 and perform (or process) a function of the second application program 380 in the same context as that of the electronic device 101 based on the received event while the second application program 380 is running in the external server 201.

At step 525, the external server 201 may generate result data by processing the event. The external server 201 may generate the result data (e.g., video and/or audio data) as a consequence of a computation required according to the event information.

At step 527, the external server 201 may transmit the result data to the electronic device 101. The external server 201 may stream the result data acquired as a consequence of the computation to the electronic device 101.

At step 529, the electronic device 101 may output the result data received from the external server 201. The electronic device 101 may receive the result data corresponding to the transmitted event information from the external server 201 and output the result data, as the result data is received or after the result data has been additionally processed, to the user via an output device (e.g., a display and/or a speaker).

Figure 6:
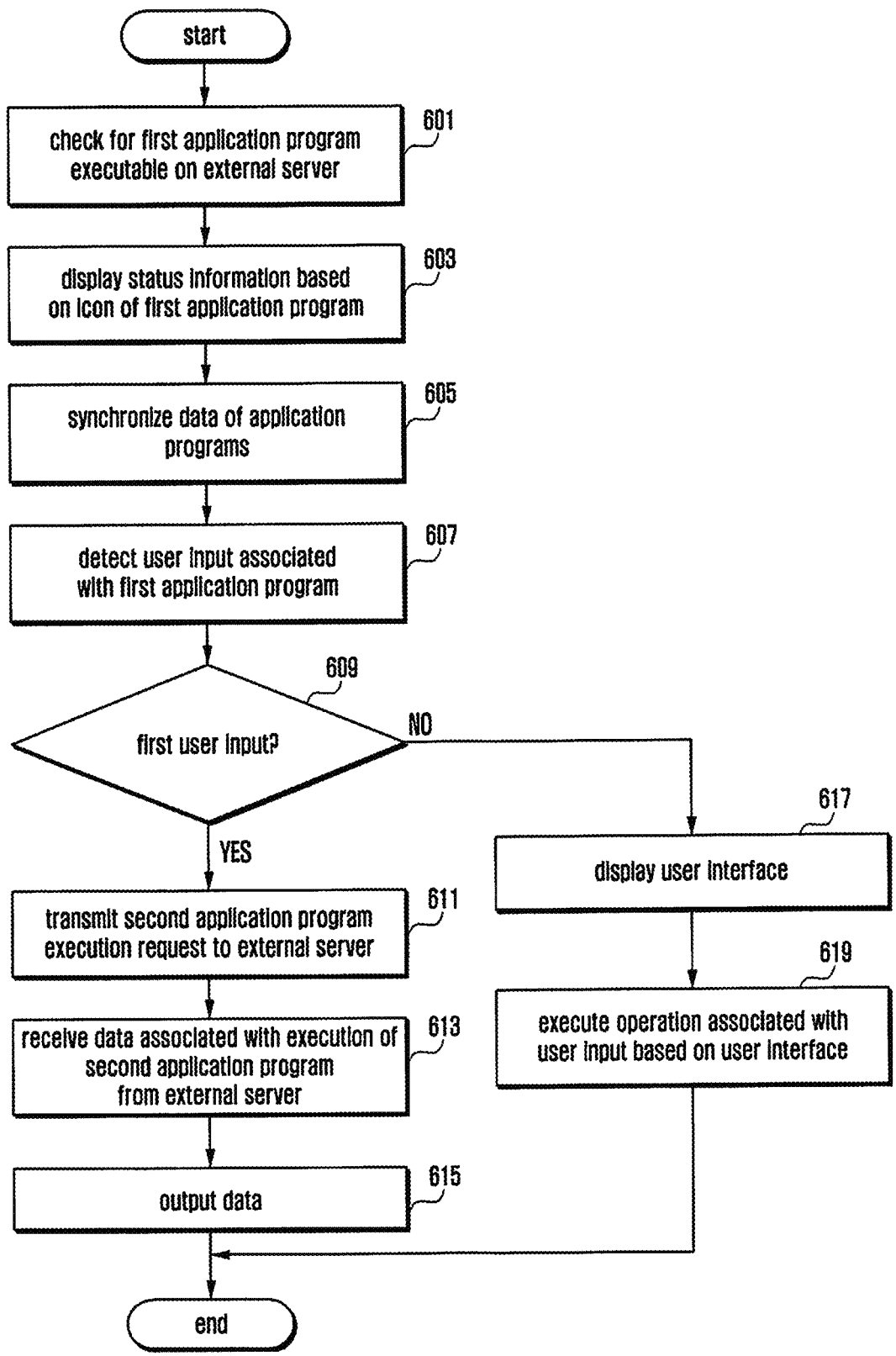
FIG. 6 is a flowchart illustrating an operation method of an electronic device according to an embodiment.

FIG. 6 is a flowchart illustrating an operation method of an electronic device 101 according to an embodiment.

Referring to FIG. 6, the operations of the electronic device 101 may be executed by at least one processor 120 (including a processing circuit) of the electronic device 101 of FIG. 1. The operations of the electronic devices 101 may be carried out by a processor executing instructions stored in a memory 130.

The processor 120 of the electronic device 101 may check (or monitor) at step 601 for an application program (e.g., the first application program 330) executable in the external server 210. The processor 120 may determine (or monitor) whether an application program (e.g., the second application program 380) of an external server 201 that performs at least some functions associated with an application program (e.g., the first application program 330) among application programs installed in the electronic device 101 is executable in the external server 201.

The processor 120 may determine whether the second application program 380 can be executed on the external server 201 based on designated time information (e.g., a designated time interval or a designated point in time).

The processor 120 may determine whether the second application program 380 can be executed in association with the first application program 330 in the external server 201 at the time when the first application program 330 is installed in the electronic device 101. If a user input for executing the second application program 380 of the external server 201 in association with the first application program 330 is received (or detected), the processor 120 may determine whether the second application program 380 corresponding to the first application program 330 can be executed on the external server 201.

The processor 120 may scan various external servers for the presence of an external server that is capable of providing a service better in quality than the currently connected (or configured) external server 201 in association with the first application program 330 that is determined can be executed on the external server 201.

At step 603, the processor 120 may display state information (e.g., an object or an indication) with an icon representing the first application program 330 executable by the external server 201 based on a check result. If it is determined that the second application program 380 corresponding to the first application program 330 is executable in the external server 210, the processor 120 may display a designated object (or indication) (e.g., a badge image in a shape of cloud) on the icon of the first application program 330. The processor 120 may display the object such that the object is at least partly overlapped (or overlaid) with the icon of the first application program 330.

The processor 120 may receive a list of application programs executable in the external server 201 from the external server 201 and, if the application program list contains the second application program 380 associated with the first application program 330, display an object indicative thereof. The electronic device 101 or the external server 201 may identify a corresponding relationship between the application programs based on unique information (e.g., an AID) on the application programs. If the external server 201 completes authentication on the first application program 330, the processor 120 may display an object indicative thereof based on a response (e.g., an ACK) from the external server 201. A detailed description thereof is provided below with reference to the accompanying drawings.

At step 605, the processor may perform data synchronization between the application programs (e.g., the first application program 330 of the electronic device 101 and the second application program 380 of the external server 201). The processor 120 may perform data synchronization upon detection of a difference between data associated with the respective application programs running on the electronic device 101 and the external server 201 (e.g., first data of the first application program 330 stored in the electronic device 101 and second data of the second application program 380 stored in the external server).

At step 607, the processor may detect (or receive) a user input associated with the first application program 330. The processor 120 may identify an input gesture made for the user input in association with the icon of the first application program 330 and/or the object (or indication) and proceed to execute an application according to the user input or provide (or display) a user interface (e.g., a context menu) associated with the application program. The description is made in association with a first user input for executing the second application program 380 of the external server and a second user input for display of a user interface (e.g., a context menu).

At step 609, the processor 120 may determine whether the user input is the first user input or the second user input. The processor 120 may determine whether the user input made to the icon of the first application program 330 and/or the object is the first user input (e.g., a touch, a double touch, or a long touch) designated for executing the second application program 380 of the external server 201 or the second user input designated for executing (or calling) a user interface. The second user input may be a user input made in a manner different from that in which the first user input is made. For example, if the first user input is made with a touch gesture, the second user input may be made with a long touch gesture.

If it is determined at step 609 that the user input is the first user input for executing the second application program 380 of the external server 201 (e.g., the operation result at step 609 is YES), the processor 120 may transmit, at step 611, a request for executing the second application program 380 to the external server 201. For example, the processor 120 may execute the second application program 380 stored in the external server 201 such that the second application program 380 is running on the external server 201. The processor 120 may transmit to the external server 201 the request for executing the second application program along with information on the characteristics of the electronic device 101. The processor 120 may transmit to the external server 201 the request for executing the second application program along with a service profile (e.g., a service profile configured by the user or set as a default).

At step 613, the processor may receive data (e.g., video and/or audio data) (e.g., streaming data) as an execution result of the second application program 380 from the external server 201.

At step 615, the processor 120 may output the data received from the external server 201. The processor 120 may output the data, as it is received or after it has been additionally processed (e.g., decoding), to the user via an output device (e.g., a display and/or a speaker).

If it is determined at step 609 that the user input is the second user input for display of the user interface associated with the second application program 380 (e.g., the operation result at step 609 is NO), the processor 120 may display, at step 617, the user interface (e.g., a context menu) associated with the second application program 380. The user interface may include a first item (e.g., Run on Remote or Run on Server), a second item (e.g., Remote configuration or Server configuration), and/or a third item (e.g., gain information). A detailed description thereof is provided below with reference to the accompanying drawings.

At step 619, the processor 120 may execute an operation corresponding to the user input made in the user interface. The processor 120 may execute the second application program 380 in the external server 201 based on the user input for selecting the first item for executing the second application program 380 of the external server 210

The processor 120 may display a configuration-related user interface (or configuration interface) based on the user input made for selecting the second item for configuring an environment (e.g., a service profile) for executing an application program. For example, the processor 120 may request the external server 201 for a configuration-related user interface, receive the corresponding user interface from the external server 201, and display the received user interface. The processor 120 may display the configuration interface on the display 160 in such a way as to replace the user interface associated with the second application program 380 with the configuration interface including a configuration menu.

Figure 7:
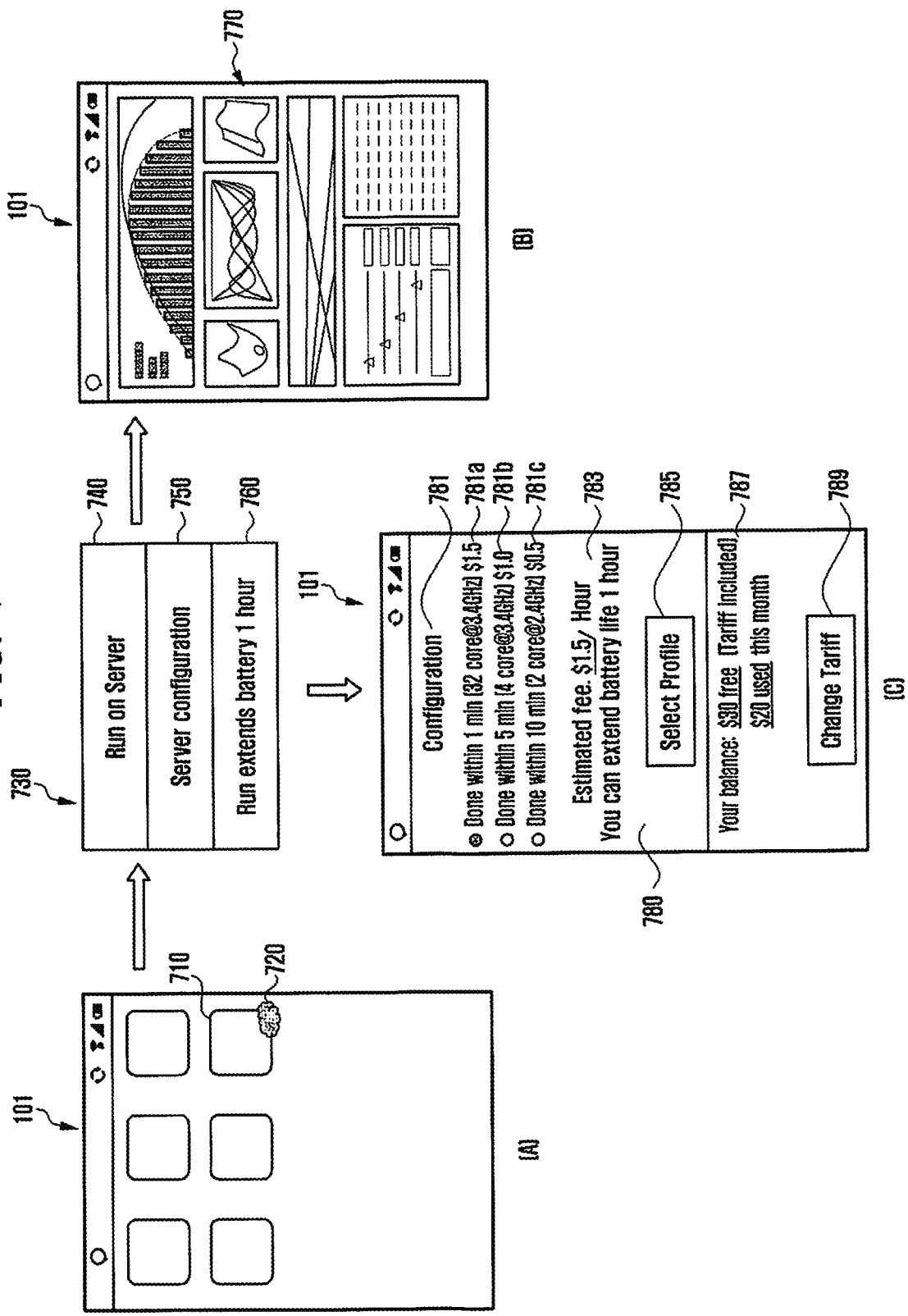
FIG. 7 is a diagram illustrating a user interface being provided by an electronic device according to an embodiment.

FIG. 7 is a diagram of a user interface provided by an electronic device according to an embodiment.

Referring to FIG. 7, a display 160 of the electronic device 101 may display a first screen display (A) including icons representing application programs (e.g., the first application program 330) installed in the electronic device 101 and/or related objects (or indications). A second screen display (B) may show data (e.g., video data) as an execution result of the second application program 380 that is received from an external server 201. A third screen display (C) may show a user interface (e.g., configuration interface) including a configuration menu of the second application program 380 to be executed on the external server 201.

The icon 710 of the application program (e.g., the first application program 330) executable in the external server 201, among the icons representing the application programs installed in the electronic device 101, may be displayed with the object 720 (or indication) indicating (or notifying or guiding) that an application program (e.g., the second application program 380) of the external server 201 is executable in correspondence with the first application program 330. The object 720 may be provided as, but is not limited to, a badge image in the shape of a cloud along with various kinds of images or texts. The object 720 may be provided so as to be at least partly overlapped (overlaid) with the icon 710.

The electronic device 101 may display a first user interface 770 on the display 160 in such a way of switching from the first screen display (A) to the second screen display (B) based on the user input made on the icon 710 of the first application program 330 and/or the object 710. For example, the electronic device 101 may display data of the first application program 330 being executed on the electronic device 101 and data of the second application program 380 being executed on the external server 201 on the display. A second user interface 730 may be displayed above (or replacing) the first screen display (A) on the display 160.

The electronic device 101 may receive a first user input, for executing the first application program 330 in the electronic device, made on at least part of the icon 710 and/or the object 710 in the first screen display (A). The electronic device 101 may execute the first application program 330 in response to the first user input and display a first user interface (e.g., an execution screen) in association with the execution of the first application program 330 as shown in the second screen display (B).

The electronic device 101 may display a guidance interface (e.g., a popup window) for selecting a host for executing the application program in response to the first user input made onto the icon 710 and/or the object 720. For example, the user may opt for executing the first application program represented by the icon 710 and/or the object 720 in the external electronic device 101 or the second application program 380 corresponding to the first application program 330 in the external server 201 through the guidance interface. The electronic device 101 may execute the first application program 330 in the electronic device 101 or the second application program 380 in the external server 201 according to a decision made by the user.

The electronic device 101 may receive the second user input for executing (or calling) the second user interface 730 (e.g., a context menu), which is made onto at least part of the icon 710 and/or the object 720 in the first screen display (A). The electronic device 101 may display the second user interface 730 (e.g., a context menu) associated with the second application program 380 of the external server 201 on the display 160 in response to the second user input. The second user interface 730 may include a first item 740 (e.g., Run on Server), a second item 750 (e.g., Server configuration), and/or a third item 760 (e.g., Run 1 hour extends battery).

In the second user interface 730, the first item 740 may be an item that can be selected for executing the second application program 380 in the external server 201. In the second user interface 730, the second item 750 may be an item that can be selected for configuring an environment (e.g., a service profile) for executing the second application program 380 in the external server 201.

In the second user interface 730, the third item 760 may be an item for providing information on the gain expected with the execution of the second application program 380 in the external server 201. For example, the third item 760 may provide information in order for the user to refer to the information to select an environment for executing the application program based thereon. For example, the electronic device 101 may provide a message such as "Run extend battery 1 hour" and/or "response speed is 30 msec" using the third item 760 in the second user interface 730.

The electronic device 101 may receive a third user input made via the first item 740 in the second user interface 730. The electronic device 101 may transmit a request for executing the second application program 380 to the external server 201 based on the third user input. The electronic device 101 may receive data as an execution result of the second application program 380 from the external server 201 and display the received data on the display 160 in the first user interface 770 as shown in the second screen display (B).

A third user interface 780 including a configuration menu associated with the second application program 380 to be executed on the external server may be displayed as shown in the screen display (C). The user may select the second item 750 in the second user interface 730. The electronic device 101 may change the screen to display the third user interface 780 on the display 160 as shown in the third screen display (C).

The third user interface 780 may include various configuration menus in order for the user to select a service profile. The third user interface 780 may include a menu 781 (e.g., "Configuration") for configuring service profiles 781a, 781b, and 781c, a menu 783 for providing billing information (e.g., "Estimated fee. $1.5/Hour") on the selected service profile 781a (e.g., "Done within 1 min (32 core @3.4 GHz) $1.5"), a menu 783 for providing selected service profile-based quality information (or gain information) (e.g., "You can extend battery life 1 hour"), a menu 785 (e.g., "Select Profile" button) for selecting a service profile (e.g., confirming selection), a menu 787 for providing user information (e.g., user's service subscription information (e.g., "Your balance: $30 free (Tariff included") and/or usage information (e.g., "$20 used this month")), and/or a menu 789 (e.g., "change Tariff" button) for changing a billing plan.

According to an embodiment, as exemplified by service profiles 781a, 781b, and 781c, the kinds of available computing resources may include a CPU, a random access memory (RAM), storage, and a network type (e.g., 3G, 4G, LTE, or 5G), and the capabilities of the computing resources may include a clock rate of the CPU (e.g., 3.4 GHz), RAM capacity (e.g., 4 GB), GPU memory capacity (e.g., 256 MB), and network type-specific available data amount (e.g., 40 GB in 5G and unlimited in 4G).

The user may check the types of resources (e.g., service profiles 781a, 781b, and 781c) that can be provided by the external server 201 in the third user interface 780 and make a resource selection decision as part of the operation requesting use of the external server 201 (e.g., a request for executing the second application program 380). For example, the third user interface 780 may provide the information on the resources (e.g., clock rates and a number of processing devices, memory size, and/or storage space size) available per each of the service profiles 781a, 781b, and 781c.

The third user interface 780 may provide information on the gain expected from using the selected one of the service profiles 781a, 781b, and 781c as denoted by reference number 783. For example, the user may check for the information on the gain expected from using a service profile by selecting the service profile in the third user interface 780.

For example, the third user interface 780 may display the battery lifetime (or use time) prolonged and/or the processing time (e.g., a process completion time) shortened by executing the second application program 380 in the external server 201 instead of executing the first application program 330 in the electronic device 101 in order to help the user select an appropriate service profile.

The battery use amount may be displayed by referring to a battery use profile of the first application program 330 and a battery use prediction value according to the resources being used for streaming. The processing time may be provided as a prediction value acquired by comparing the resource configurations of the external server 201 based on the type of the processing device (e.g., a number and peak clock rate of cores). The third user interface 780 may indicate the maximum gain per each of the types of resources available in the external server 201 according to the current billing plan subscribed by the user using various types of objects (e.g., a color and/or a number (e.g., shortened processing time)) such that the user intuitively perceives the information.

The method is not limited to the disclosed embodiments, and the third user interface 780 may be configured to display the information on various types of gains in addition to the aforementioned gain. The information on the gain may be provided with an extra icon, e.g., an icon indicating prolonged battery use time, in addition to the icon 710 of the first application program 330 and/or the object 720 such that the user intuitively perceives the information on the gain.

The electronic device 101 may receive a fourth user input associated with the execution of the second application program 380 in the external server via at least part of the icon 710 and/or the object 720 in the first screen display (A). The electronic device may request to the external server 201 for executing the second application program 380 based on the fourth user input. The electronic device 101 may provide the user with the second screen display (B) upon receipt of data as an execution result of the second application program 380 in the external server in response to the request for executing the second application program 380.

Figure 8:
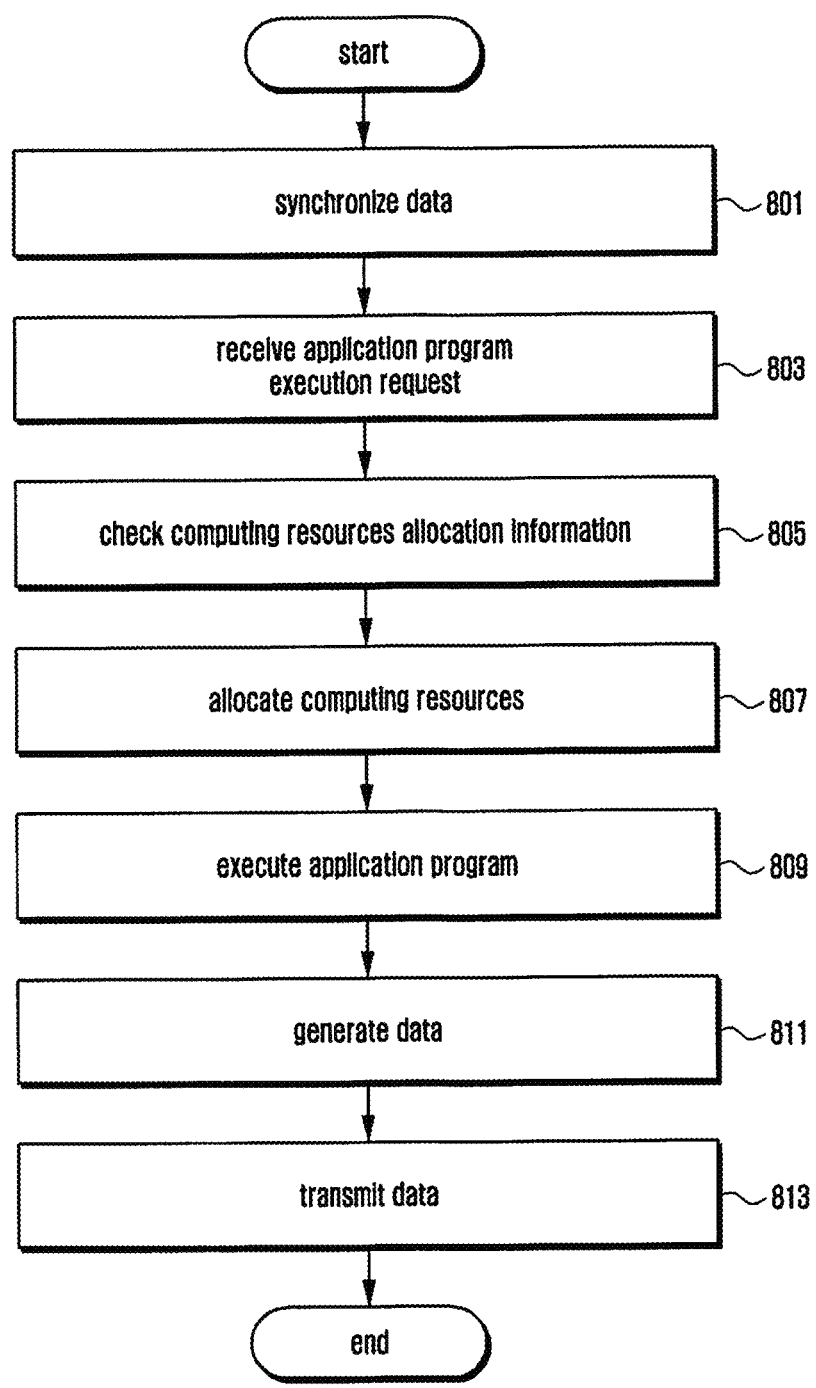
FIG. 8 is a flowchart illustrating an operation method of an external server according to an embodiment.

FIG. 8 is a flowchart illustrating an operation method of an external server 201 according to an embodiment.

Referring to FIG. 8, the operations of the external server 201 may be executed by at least one processor 370 among multiple processors of the external server 201. The operations of the external server 201 may be carried out by the processor 370, which executes instructions stored in a memory 360.

In step 801, the processor 370 of the external server 201 may synchronize data associated with an application program (e.g., the second application program 380 of the external server 201) with the electronic device 101 (e.g., the first application program 330 of the electronic device 101). If there is any difference between data associated with the corresponding application programs (e.g., first data of the first application program 330 stored in the electronic device 101 and second data of the second application program 380 stored in the external server 201), the processor 370 may perform data synchronization.

At step 803, the processor may receive a request for executing the second application program 380 from the electronic device 101. The processor 370 may receive the request for executing the second application program 380 along with characteristic information of the electronic device 101 and/or a service profile (e.g., the service profile configured by the user or set as a default) from the electronic device 101.

At step 805, the processor may check the service profile (e.g., a type and/or a capability of available computing resources) for allocating computing resources for executing the second application program 380 based on the request for executing the second application program 380. The service profile may include resource information of a virtual device 390. The resource information may include a type and a number of processing devices, a size and input/output speed of a storage device (e.g., a memory), or presence/absence and a type of a graphic accelerator that are for the second application program 380.

At step 807, the processor 370 may allocate computing resources based on the service profile. For example, the processor 370 may allocate (or configure) resources for executing the second application program 380 based on the service profile (e.g., a service profile configured by the user or set as a default) according to the request for executing the second application program 380. The computing resources may include hardware resources and/or for use by a virtual device 390 of the external server 201 in executing the second application program 380 and/or network resources for use in communication between the external server 201 and the electronic device 101.

At step 809, the processor 370 may execute the second application program 380. The processor 370 may configure (or assign) a virtual device appropriate for the electronic device 101 (or the second application program 380) based on the characteristic information of the electronic device 101, the characteristic information of the network, or the service profile and execute the second application program 380 using the hardware resources allocated to the corresponding virtual device. The processor 370 may execute the second application program 380 in an environment that is substantially identical with a last environment in which the first application program 330 was operating in the electronic device 101 using the data pre-synchronized with the electronic device 101 (or the second application program 380).

At step 811, the processor 370 may generate data (e.g. audio and/or video data (or information)) associated with the execution of the application program. The processor 370 may acquire the data as an execution result of the application executed using the computing resources according to the service profile transmitted by the electronic device 101.

At step 813, the processor 370 may transmit (stream) the generated data (e.g., audio and/or video data) to the electronic device 101.

Figure 9:
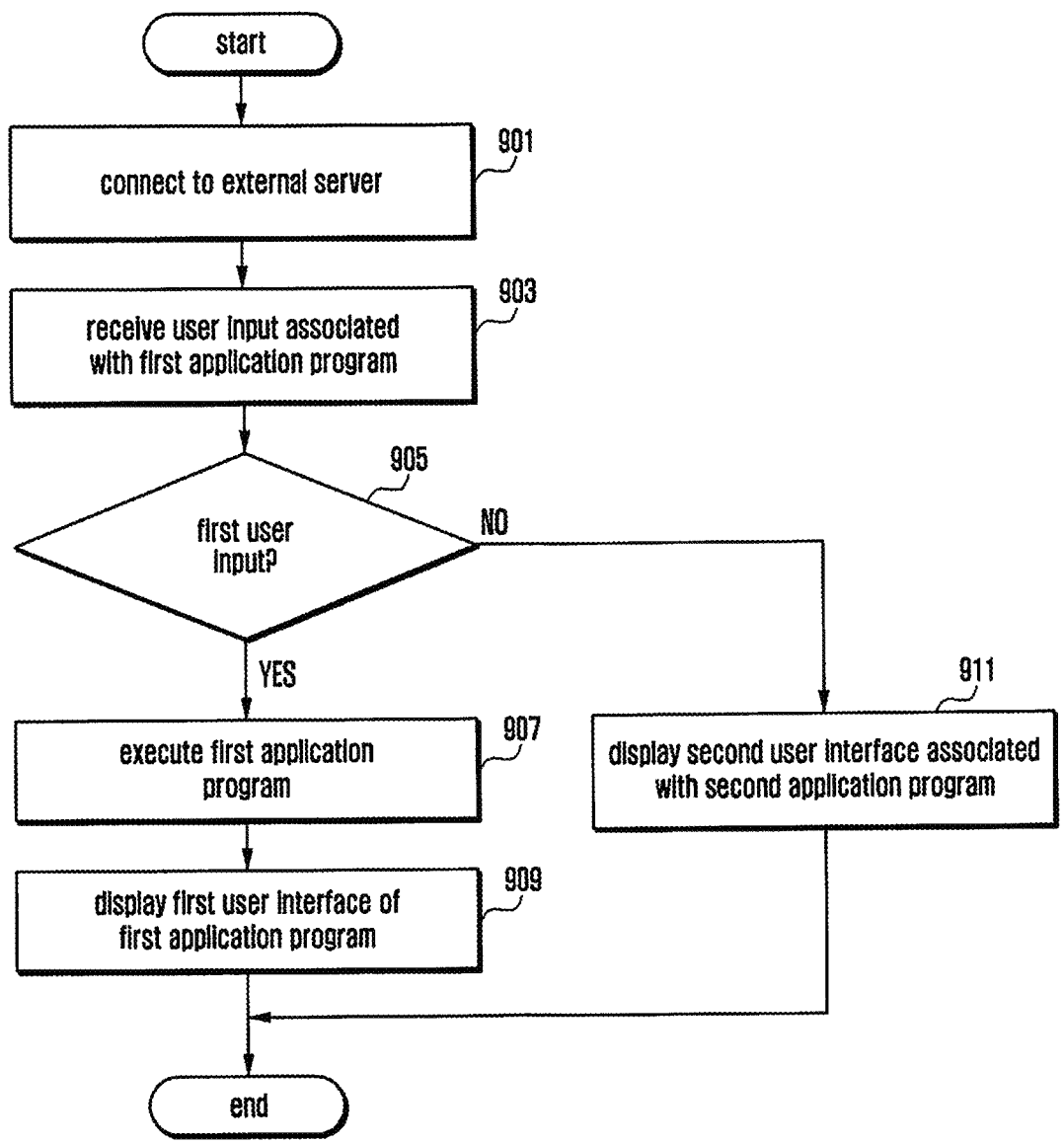
FIG. 9 is a flowchart illustrating an operation method of an electronic device according to an embodiment.

FIG. 9 is a flowchart illustrating an operation method of an electronic device 101 according to an embodiment.

Referring to FIG. 9, the operations of the electronic device 101 may be carried out by at least one processor 120 (including a processing circuit) of the electronic device 101 of FIG. 1. The operations of the electronic device 101 may be carried out by the processor 120, which executes instructions stored in a memory 130.

The processor 120 may establish a connection to the external server 201 at step 901. The processor 120 may establish a connection to the external server 201 located in a network (e.g., a base station or a core network connected to the base station) via a radio communication circuit (e.g., the communication module 90 or wireless communication module 192) and store a second application program (e.g., the second application program 380 of the external server 201) that can be executed in place of at least part of the operations of a first application program (e.g., the first application program 330 of the electronic device 101). The first application program 330 and the second application program 380 may share at least part of their functions and may each be included (or installed) in its own host device (e.g., the electronic device 101 or the external server 201).

The processor 120 may receive information indicative of the second application program 380 from the external server 201 during or after establishing the connection between the electronic device 101 and the external server 201. For example, the information indicative of the second application program 380 may include information indicating that the external server 201 is capable of executing the second application program 380 associated with the first application program 330 in the external server. The external server 201 may execute the second application program 380 corresponding to (at least partly identical with) the first application program 330 to provide an environment at least partly identical with that in which the first application program 330 is executed on the electronic device 101.

The processor 120 may display an icon 710 associated with the first application program 330 and an indication or object 720 associated with the second application program 380 on a display 160 such that the icon and the indication are at least partly overlapped, during or after a connection is established between the electronic device 101 and the external server 201.

At step 903, the processor 120 may receive a user input associated with the first application program 330. The processor 120 may identify an input gesture made for the user input in association with the icon of the first application program 330 and the indication (or object) and proceed to execute the first application program 330 in the electronic device 101 or provide (or display) a second user interface (e.g., a context menu) associated with the second application program 380 according to the user input.

Examples of the user input may include a first user input for executing the first application program 330 in the electronic device 101 and a second user input for executing (or calling) a second user interface associated with the second application program 380 installed (or stored) in the external server 201, where the second application program 380 corresponds to the first application program 330. The first and second user inputs may be made via the icon 710 and/or the indication 720. The first and second user inputs may differ in their input manner. For example, the first user input may be made with a short touch gesture while the second user input may be made with a long touch gesture.

At step 905, the processor may determine whether the user input is the first user input for executing the first application program 330 or the second user input for calling for the second user interface.

If it is determined that the user input is the first user input for executing the first application program 330 (e.g., the result of step 905 is YES), the processor 120 may execute the first application program 330 in the electronic device 101 at step 907.

At step 909, the processor may display a first user interface of the first application program 330 on the display 160. The processor 120 may execute the first application program 330 in the electronic device 101 and display the first user interface associated with the first application program 330 on the display of the electronic device 101.

If it is determined at step 905 that the user input is the second user input for calling for the second user interface (e.g., the result of step 905 is NO), the processor 120 may display, at step 911, the second user interface 730 (e.g., a context menu) associated with the second application program 380 on the display 160. After displaying the second user input (e.g., context menu), the processor 120 may receive a third user input via the second user interface.

The processor 120 may receive the third user input on an item 740 for selecting an environment for executing an application program (e.g., execution on the external server 201) via the second user interface and transmit to the external server 201 a request for executing the second application program 380 on the external server 201 via the radio communication circuit (e.g., the communication module 190 or the wireless communication module 192) based on at least part of the third user input. The processor 120 may receive data associated with an execution result of the second application program 380 from the external server 201 and display a user interface including the received data on the display of the electronic device 101.

Figure 10:
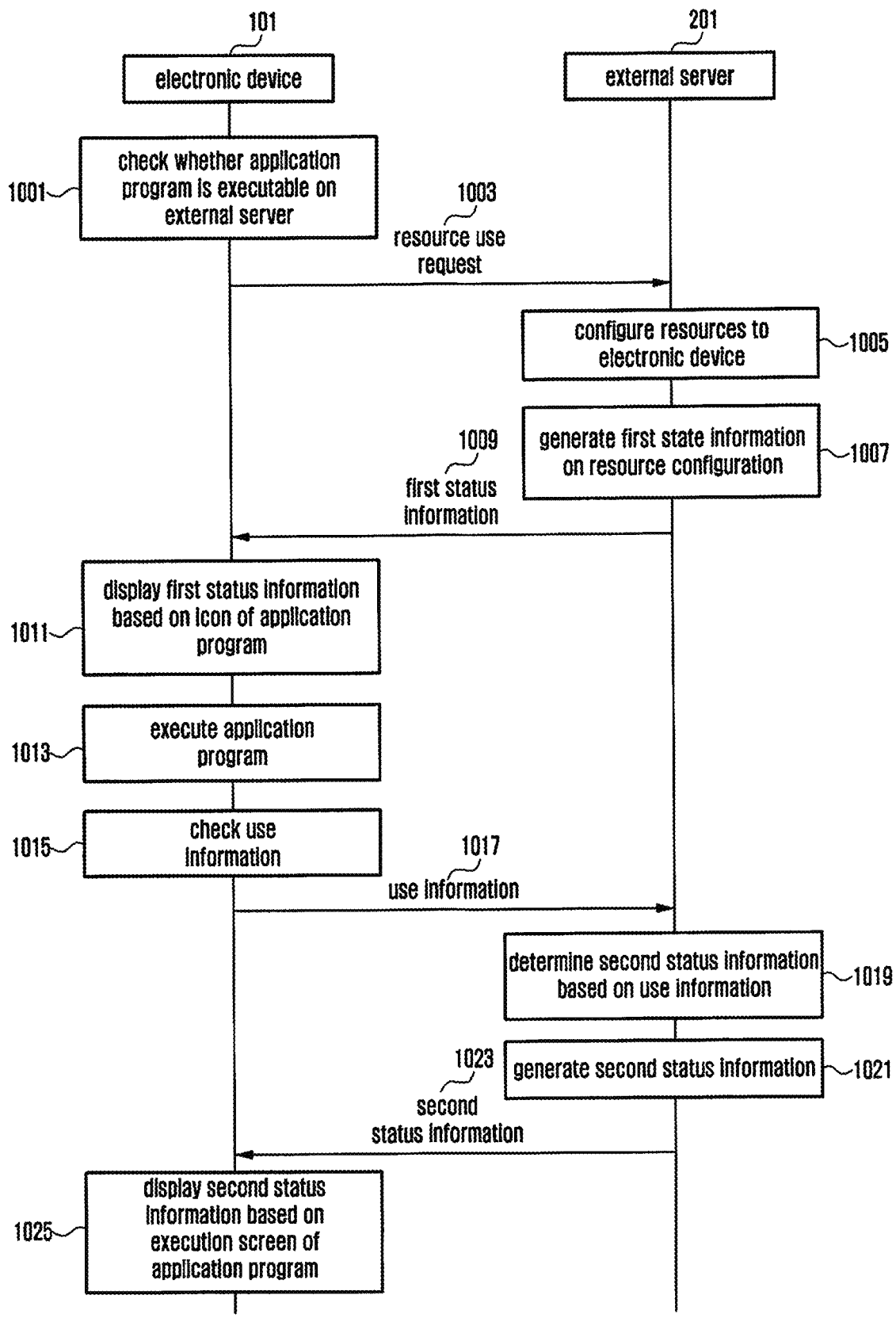
FIG. 10 is a signal flow diagram of operations between an electronic device and an external server according to an embodiment.

FIG. 10 is a signal flow diagram illustrating operations between an electronic device 101 and an external server 201 according to an embodiment.

Referring to FIG. 10, the operations may be carried out with instructions being executed by a processor 120 of the electronic device 101 and instructions being executed by a processor 370 of the external server 201. An application program may be executed on the electronic device 101, which provides a user with information for changing when virtualization is executed according to the use of the application program.

At step 1001, the electronic device 101 may check (or monitor) whether an application program (e.g., the second application program 380 of the external server associated with the first application program 330 of the electronic device 101) is executable on the external server 201. The electronic device 101 may determine whether an application program (e.g., the second application program 380 of the external server 201) at least partly corresponding in function to an application program (e.g., the first application program 330 of the electronic device 101), among the application programs installed in the electronic device 101, can be executed on the external server 201.

The processor 120 may determine whether the second application program 380 can be executed based on designated time information (e.g., at a designated time interval or a designated point in time). The processor 120 may determine whether the second application program 380 can be executed in association with the first application program 330 in the external server 201 at the time when the first application program 330 is installed in the electronic device 101. If a user input for executing the second application program 380 of the external server 201 in place of the first application program 330 is received (or detected), the processor 120 may determine whether the second application program 380 corresponding to the first application program 330 can be executed on the external server 201.

The electronic device 101 may receive a list of application programs executable on the external server 201 from the external server 201 and, if the application program list contains the corresponding application, determine that the second application program 380 can be executed. If the external server 201 completes authentication on the first application program 330, the electronic device 101 may determine that the second application program 380 can be executed based on a response (e.g., an ACK) from the external server 201.

The electronic device 101 or the external server 201 may identify a correspondence relationship between the application programs based on unique information on the application programs (e.g., an AID). Whether the second application program 380 can be executed on the external server 201 may be determined based on environmental factors such as network status (e.g., latency and bandwidth) between the external server 201 and the electronic device 101 and available resource status of the external server 201. For example, whether the second application program 380 can be executed may be determined based on the computing resources.

At step 1003, the electronic device 101 may transmit a request for use of resources for the second application program 380 to the external server 201. The electronic device 101 may transmit to the external server 201 a selected service profile (e.g., a service profile configured by the user or set as a default) along with the request for use of resources. The electronic device 101 may transmit to the external server 201 unit identity information (or user information of the electronic device 101) along with the request for use of resources.

At step 1005, the external server 201 may configure resources for the electronic device 101. The external server 201 may allocate computing resources based on the service profile. For example, the external server 201 may allocate (or configure) resources for executing the second application program 380 based on the service profile received from the electronic device 101. The computing resources may include hardware resources for use by a virtual device 390 of the external server 201 in executing the second application program 380 and/or network resources for use in communication between the external server 201 and the electronic device 101.

At step 1007, the external server 201 may generate status information on resource configuration. The external server 201 may check environmental factors such as the network status (e.g., latency and bandwidth) and or available resource status of the external server 201 and generate first status information indicative of the current status (or information on the gain expected by virtually executing the application program) based on the status of the electronic device 101 such as a billing rate of the user and whether the user has performed application program synchronization.

At step 1009, the external server 201 may transmit the first status information to the electronic device 101. The first status information being transmitted from the external server 201 to the electronic device 101 may be the information indicative of the status of the electronic device 101 before the first application program 330 is executed and the electronic device 101 may be changed according to a performance change (e.g., performance degradation) of the electronic device 101 as the first application program 330 is executed on the electronic device 101. For example, it may be possible to achieve a greater gain than that expected from the first status information (or at the point in time when the first status information is provided) by virtually executing the second application program 380 on the external server 201 at a corresponding point in time while the first application program 330 is running on the electronic device 101. For example, the first status information may be updated to more enhanced status information (e.g., second status information) (e.g., information on the gain expected by virtually executing the second application program 380 at the corresponding point in time).

At step 1011, the electronic device 101 may display the first status information received from the external server 201. The electronic device 101 may display a designated object (or indication) corresponding to the status information based on an icon of the first application program 330. The designated object may indicate that the first application program 330 is virtually executed on the external server 201 and present information on the gain expected with the virtual execution. The electronic device 101 may display the first status information such that the first status information is overlapped (or overlaid) with at least part of the icon of the first application program 330.

At step 1013, the electronic device 101 may execute the first application program 330 based on a user input associated with the execution of the first application program 330 on the electronic device 101. The electronic device 101 may display an execution screen (or user interface) associated with the first application program 330 on a display (e.g., the display device 160 in FIG. 1) while the first application program 330 is running. The electronic device 101 may display the first status information indicating that the first application program 330 executed (or in use) may be virtually executed (e.g., the second application program 380 associated with the first application program 330 may be executed on the external server 201) and presenting the information on the gain expected with the virtual execution.

At step 1015, the electronic device 101 may check for the use information associated with the first application program 330 while the first application program 330 is running. The electronic device 101 may determine a status of the computing resources in use by the electronic device 101 for executing the first application program 330. For example, the electronic device 101 may determine the status of the computing resources such as battery resources (e.g., a use amount and/or a remaining amount), processing time, temperature of the electronic device 101, or network signal strength.

At step 1017, the electronic device 101 may transmit the use information associated with the first application program 330 to the external server 201.

At step 1019, the external server 201 may determine the second status information based on the use information received from the electronic device 101. The first status information transmitted from the external server 201 to the electronic device 101 at step 1009 may be changed according to the performance change (e.g., performance degradation) of the electronic device 101 that is caused by the execution of the first application program 330 on the electronic device 101.

It may be possible to achieve a greater gain than that expected from the first status information (or at the point in time when the first status information is provided) by virtually executing the second application program 380 on the external server 201 at a corresponding point in time while the first application program 330 is running on the electronic device 101. For example, the first status information may be updated to more enhanced status information (e.g., second status information) (e.g., information on the gain expected by virtually executing the second application program 380 at the current point in time). The external server 201 may determine a current status of the electronic device 101 based on the user information and an estimate of a prolonged battery use time and a shortened processing completion time as a result of the virtual execution of the second application program 380 based on the current status.

At step 1021, the external server 201 may generate the second status information updated based on the user information. The external server 201 may generate the second information including information on the gain changed (or enhanced) according to a change of the status of the electronic device 101 (e.g., information on the gain expected with virtual execution of the second application program 380 at the current point in time).

At step 1023, the external server 201 may transmit the second status information to the electronic device 101.

At step 1025, the electronic device 101 may display the second status information on the execution screen (or user interface) associated with the application program. The electronic device 101 may update the first status information, which is displayed on at least part of the execution screen (or user interface) associated with the first application program 330, with the received second status information.

Figure 11:
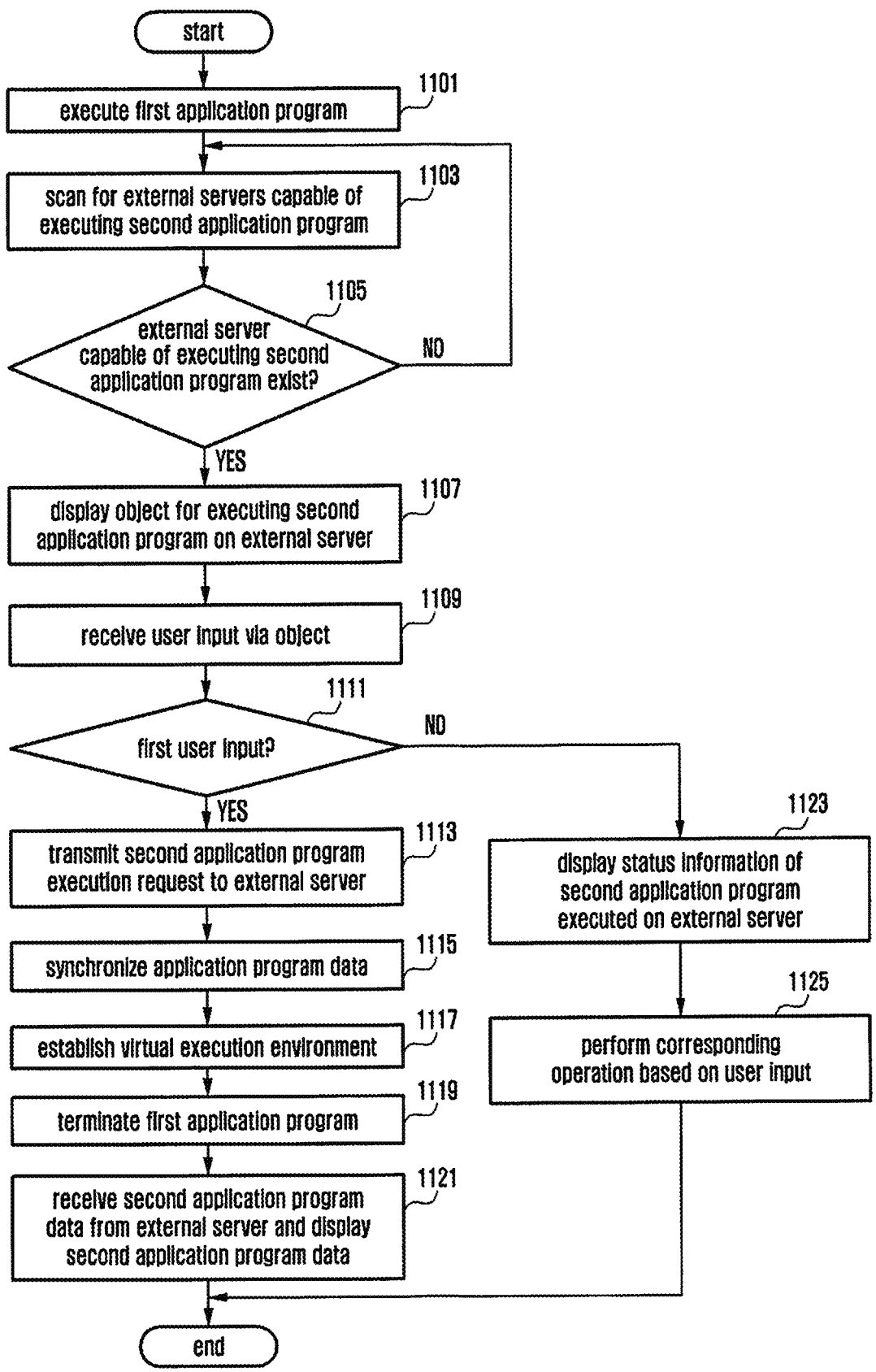
FIG. 11 is a flowchart illustrating an operation method of an electronic device according to an embodiment.

FIG. 11 is a flowchart illustrating an operation method of an electronic device 101 according to an embodiment.

Referring to FIG. 11, the operations of the electronic device 101 may be carried out by at least one processor 120 (including a processing circuit) of the electronic device 101 of FIG. 1. The operations of the electronic device 101 may be carried out by the processor 120, which executes instructions stored in a memory 130.

The processor 120 may execute an application program (e.g., the first application program 330 of the electronic device), provide (e.g., display) information indicating that the external server 201 can execute an application program (e.g., the second application program 380 of the external server 201 in FIG. 3 or 4) associated with the first application program 330 while the first application program 330 is running on the electronic device 101, and execute the second application program 380 of the external server 201 in place of the first application program 330 of the electronic device 101 based on a user input made on the displayed information. For example, executing the second application program 380 on the external server 201 may include executing (or virtually executing) the second application program 380 of the external server 201 in place of the first application program 330 of the electronic device 101.

The processor 120 of the electronic device 101 may execute the first application program 330 at step 1101. The processor 120 may execute the first application program 330, among the application programs stored (or installed) in the electronic device 101, in response to a user input and display data (or an execution screen) as an execution result of the first application program 330 on a display 160.

At step 1103, the processor 120 may scan for external servers (e.g., the external server 201) capable of executing the second application program 380 associated with the first application program 330 while the first application program 330 is running on the electronic device 101. The processor 120 may scan for an external server 201 on which the second application program 380 associated with the first application program 330 running on the electronic device 101 can be executed. If the first application program 330 running on the electronic device 101 is an application program executable on an external server, the processor 120 may scan for a server available for executing the second application program 380 associated with the first application program 330.

At step 1105, the processor 120 may determine whether there is an external server capable of executing the second application program 380 based on a scanning result.

If it is determined at step 1105 that there is no external server capable of executing the second application program 380 (or there is no scanned external server) (e.g., the result of step 1105 is NO), the method returns to step 1103 to continue scanning for external servers.

If it is determined at step 1105 that there is an external server capable of executing the second application program 380 (or there is a scanned external server) (e.g., the result of step 1105 is YES), the processor 120 may display an object (e.g., an indication) for use in executing the second application program 380 on the display 160 at step 1107. If it is possible to virtually execute the second application program 380 on the external server 201, the processor 120 may display an object (e.g., a badge image) for use in virtually executing the second application program 380 on at least part of the execution screen of the first application program 330 (e.g., a top area or an indication area of the execution screen).

At step 1109, the processor 120 may receive a user input made via the object.

At step 1111, the processor 120 may determine whether the user input is a first user input or a second user input. The processor 120 may determine whether the user input is the first user input (e.g., a short touch gesture, a double-touch gesture, a long touch gesture, or a swipe gesture) for virtual execution of the second application program 380 or the second input for displaying (or calling) a user interface (e.g., a guidance menu) including information related to the virtual execution of the second application program 380. The second user input may be a user input made in a manner different from that in which the first user input is made. For example, the first user input may be made with a touch gesture, and the second user input may be a swipe gesture (e.g., a swipe down/up/right).

If it is determined at step 1111 that the user input is the first user input (e.g., result of step 1111 is YES), the processor 120 may transmit, at step 1113, a request for executing the second application program 380 to the external server 201.

At step 1115, the processor 120 may synchronize data associated with the application programs. The processor 120 may synchronize the current status (or current data or stored data) of the first application program 330 running on the electronic device 101 with the data associated with the second application program 380 of the external server 201.

At step 1117, the processor 120 may check for the establishment of a virtual execution environment for operation (or execution) of the second application program 380 on the external server 201. The external server 201 may establish the virtual execution environment (e.g., a virtual device configuration) upon receipt of the request for executing the second application program 380 from the electronic device 101 and transmit a response (e.g., an ACK) in reply to the request. The processor 120 may establish the virtual execution environment (e.g., configure the virtual device for executing the second application program 380) upon receipt of the response received in reply to the request for executing the second application program 380 from the external server 201.

At step 1119, the processor 120 may terminate the first application program 330 running on the electronic device 101 based on the virtual execution environment being established in the external server 201.

At step 1121, the processor 120 may receive data associated with the second application program 380 from the external server 201 and display the data. The processor 120 may terminate the first application program 330 internally (or in the background). The processor 120 may output the data received from the external server 201 in place of the data associated with the first application program 330 on the display 160 to provide continuity of a working environment of the first application program 330. For example, the continuity of the working environment may include an effect of maintaining a working status of the user on the display 160.

For example, when an execution environment of an application program is switched (e.g., from the electronic device 101 to the external server 201), a first working screen of the first application program 330 running on the electronic device 101 and a second working screen of the second application program 380 that displays data received from the external server 201 as the working environment is switched may be provided as the same (or at least partly the same) screen. An application program execution environment is switched from one to another in a way to minimize a user's feeling of awkwardness about discontinuity of the working environment.

If it is determined at step 1111 that the user input is the second user input made via the object (e.g., the result of step 1111 is NO), the processor 120 may display, at step 1123, status information about the execution of the second application program 380 on the external server 201. The processor 120 may display information on the gain expected with the execution (or virtual execution) of the second application program 380 on the external server 201 via a designated user interface provided at an area as at least part of the execution screen of the first application program 330 on the display. For example, the processor 120 may provide information on a gain expected from the virtual execution of the second application program 380 using an expression such as "battery lifetime prolonged by 1 hour" or "response speed of 30 msec".

At step 1125, the processor 120 may execute an operation corresponding to the user input. The processor 120 may receive a user input made via the user interface to request virtual execution of the second application program 380 and execute an operation for virtual execution of the second application program 380 based on the user input. The processor 120 may receive a user input made to request execution of the first application program 330 on the electronic device 101 and, based on the user input, remove the user interface displaying the information on the gain from the execution screen and execute an operation associated with the execution (operation) of the first application program 330 on the electronic device 101.

Figure 12A:
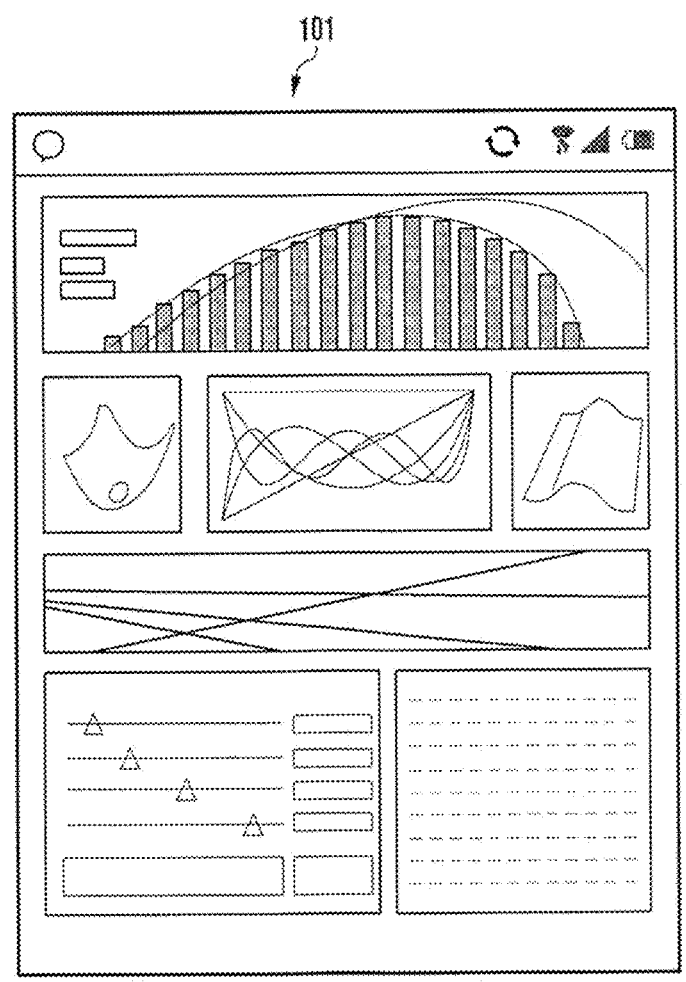
FIGS. 12A and 12B are diagrams illustrating screen displays illustrating a user interface being provided by an electronic device according to an embodiment.
Figure 12B:
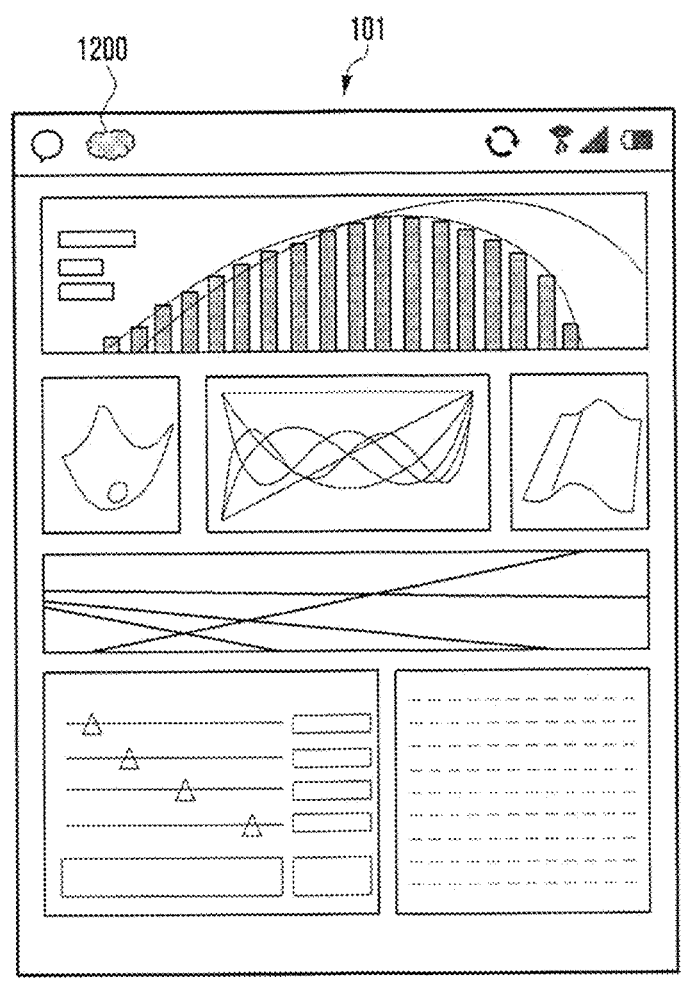

FIGS. 12A and 12B are diagrams illustrating screen displays illustrating a user interface provided by an electronic device according to an embodiment.

Referring to FIGS. 12A and 12B, a user interface associated with the operations described above with reference to FIG. 11 is shown. For example, FIGS. 12A and 12B exemplify a situation where a first application program (e.g., the first application program 330) is executed on a first electronic device 101, which displays an object 1200 indicating that a second application program (e.g., the second application program 380) associated with the first application program 330 can be executed (or virtually executed) on an external server while the first application program 330 is running on the electronic device 101. Executing the second application program 380 on the external server 201 may include executing (or virtually executing) the second application program 380 on the external server 201 in place of the first application program 330 of the electronic device 101.

In FIG. 12A, a user interface of the first application program 330 that is executed on the electronic device 101 is displayed on the display 160. The electronic device 101 may scan for servers (e.g., the external server 201) that are capable of executing the second application program 380 associated with the first application program 330 while the first application program 330 is running on the electronic device 101.

The electronic device 101 may receive a list of application programs executable on the external server 201 and, if the application program list includes the first application program 330, determine that the second application 380 can be in a state of being executable. If the external server 201 has completed authentication on the first application program 330, the electronic device 101 may determine that the second application program 380 is in the state of being executable based on receipt of a response (e.g., an ACK) from the external server 201.

Whether the second application program 380 is in the state of being executable may be determined based on environmental factors such as a network status (e.g., latency and bandwidth) between the external server 201 and the electronic device 101 and an available resource status of the external server 201. For example, whether the second application program 380 is in the state of being executable may be determined based on computing resources.

If an external server 201 that is capable of executing the second application program 380 is detected (or scanned) based on a result of scanning for external servers, the electronic device 101 may display an object 1200 associated with execution of the second application program 380 at an area of a screen on the display 160.

If it is determined that the second application program 380 can be virtually executed by the external server 201, the electronic device 101 may display to the user the object 1200 (e.g., a badge image) associated with virtual execution at an area (e.g., a top area or an indication area) of an execution screen of the first application program 330. The object 1200 associated with virtual execution may aim to notify the user that executing the second application program 380 on the external server 201 is advantageous for the user.

Figure 13A:
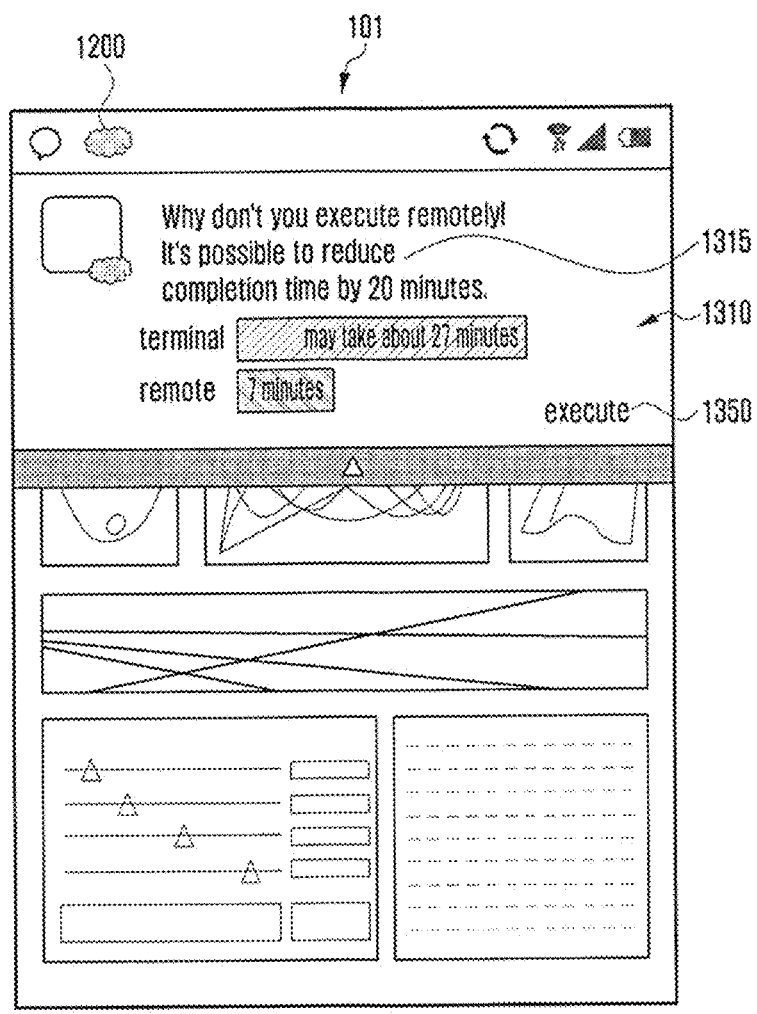
FIGS. 13A and 13B are diagrams illustrating screen displays illustrating a user interface being provided by an electronic device according to an embodiment.
Figure 13B:
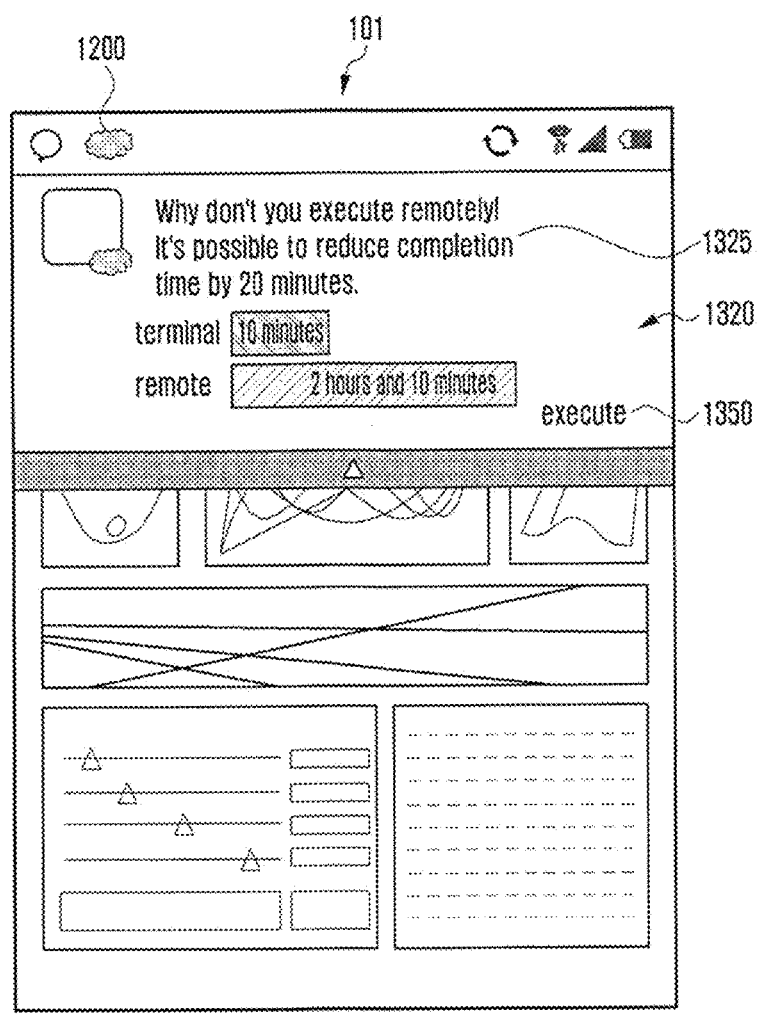

The electronic device 101 may immediately carry out an operation related to virtual execution of the second application program 380 or display a user interface 1310 including information on the gain expected with the virtual execution as shown in FIG. 13A or 13B, upon receipt of a user input made via the object 1200 on the screen as shown in FIG. 12B.

If the user input made via the object 1200 is a first user input associated with virtual execution of the second application program 380, the electronic device 101 may carry out an operation associated with the virtual execution of the second application program 380. If the user input made via the object 1200 is a second user input associated with displaying (or calling) a user interface including information associated with virtual execution of the second application program 380, the electronic device 101 may display status information about the execution of the second application program 380 on the external server 201 using a user interface 1310 or 1320 as shown in FIG. 13A or 13B.

FIGS. 13A and 13B are diagrams illustrating screen displays illustrating a user interface being provided by an electronic device 101 according to an embodiment.

Referring to FIGS. 13A and 13B, a user interface associated with the operations described above with reference to FIG. 11 is shown. For example, FIGS. 13A and 13B exemplify a situation where a user interface 1310 or 1320 includes status information associated with execution of a second application program (e.g., the second application program 380) on an external server 201 based on a user input made via the object 1200 exemplified in FIG. 12B.

In FIG. 13A, the electronic device 101 may display information 1315 on the gain (e.g., a working time reduction) expected by executing the second application program 380 on the external server 201 in an area of at least part of an execution screen, using a user interface 1310, on the display 160 or 310. For example, the information 1315 on the gain may include a first expected time that it takes to execute the second application program 380 on the electronic device 101, a second expected time that it takes to execute the second application program 380 on the external server, and a shortened working time reduction based on the difference between the first and second expected times.

In FIG. 13B, the electronic device 101 may provide information 1325 on the gain (e.g., a prolonged use time of the electronic device 101 (e.g., a battery lifetime)) expected by executing the second application program 380 on the external server in an area of at least part of the execution screen, using a user interface 1320, on the display. For example, the information 1325 on the gain may include a first expected time for use of the electronic device 101 that is expected with the execution of the second application program 380 on the electronic device 101, a second expected time for use of the electronic device 101 that is expected with the execution of the second application program 380 on the external server 201, and a prolonged user time of the electronic device 101 based on the difference between the first and second expected times.

According to an embodiment, the user interface 1310 or 1320 may be provided to be overlapped (e.g., overlaid) with an area of at least part of the execution screen (e.g., a user interface) of the first application program 330 on the display of the electronic device 101 as shown in FIG. 13A or 13B. The information 1315 or 1325 on the gain being provided via the user interface 1310 or 1320 is not limited to the disclosed embodiments of FIGS. 13A and 13B but may include various other expected gains.

The electronic device 101 may receive a user input made via the user interface 1310 or 1320 for virtual execution of the second application program 380. For example, the electronic device 101 may receive a user input made via an object 1350 (e.g., an "execute" button) for virtual execution of the second application program 380 in the user interface 1310 or 1320 and execute the second application program 380 on the external server 201 based on the user input.

According to an embodiment, an operation method of an electronic device includes establishing a connection to an external server including a second application executable in place of at least part of operations of a first application program via a radio communication circuit, executing, upon receipt of a first user input associated with the first application, the first application, displaying a first user interface of the first application on a display, and displaying, upon receipt of a second user input associated with the first application program, a second user interface associated with the second application program on the display.

The operation method of the electronic device may include receiving information indicating that the external server includes the second application program during or after establishing the connection to the external server.

The operation method of the electronic device 101 may include displaying an icon associated with the first application program and/or an indication associated with the second application program and overlapped at least partly with the icon on the display.

The operation method of the electronic device may include receiving the first user input via the icon and/or the indication.

The operation method of the electronic device may include receiving the second user input via the icon and/or the indication.

The operation method of the electronic device may include receiving a third user input via the second user interface and transmitting to the external server a request for executing the second application program on the external server via the radio communication circuit based on at least part of the third user input.

The operation method of the electronic device may include synchronizing first data associated with the first application program of the electronic device and second data associated with the second application program of the external server.

The operation method of the electronic device may include executing the first application program on the electronic device, scanning for external servers capable of executing the first application program while the first application program is running, and displaying an object for executing the second application program on the display based on a result of scanning for the external server.

The operation method of the electronic device may include receiving a user input via the object and displaying a user interface including status information on execution of the second application program on the display based on the user input.

The external server may be located in a base station or a core network connected to the base station.

The embodiments disclosed in the present disclosure and the accompanying drawings help to explain and understand the present disclosure rather than limit the scope of the present disclosure. Thus, the scope of the present disclosure should be interpreted to include the disclosed embodiments and all possible variations and modifications derived therefrom based on the present disclosure. While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
    a display;
    a radio communication circuit configured to perform radio communication;
    at least one processor operatively connected to the display and the radio communication circuit; and
    a memory operatively connected to the at least one processor and configured to store a first application program including a first user interface,
    wherein the memory is configured to store instructions that, when executed by the at least one processor to:
    establish a connection to an external server including a second application program executable in place of at least part of operations of a first application program via the radio communication circuit,
    execute, upon receipt of a first user input associated with the first application program, the first application program,
    display a first user interface of the first application program on the display, and
    display, upon receipt of a second user input associated with the first application program, a second user interface associated with the second application program on the display.

2. The electronic device of claim 1, wherein the instructions, when executed by the at least one processor to receive information indicating that the external server includes the second application program during or after establishing the connection to the external server.

3. The electronic device of claim 1, wherein the instructions, when executed by the at least one processor to display an icon associated with the first application program and/or an indication associated with the second application program and overlapped at least partly with the icon on the display.

4. The electronic device of claim 3, wherein the instructions, when executed by the at least one processor to receive the first user input via the icon and/or the indication.

5. The electronic device of claim 3, wherein the instructions, when executed by the at least one processor to receive the second user input via the icon and/or the indication.

6. The electronic device of claim 1, wherein the instructions, when executed by the at least one processor to:
    receive a third user input via the second user interface, and
    transmit to the external server a request for executing the second application program on the external server via the radio communication circuit based on at least part of the third user input.

7. The electronic device of claim 1, wherein the instructions, when executed by the at least one processor to synchronize first data associated with the first application program of the electronic device and second data associated with the second application program of the external server.

8. The electronic device of claim 1, wherein the instructions, when executed by the at least one processor to:
    execute the first application program on the electronic device,
    scan for external servers capable of executing the first application program while the first application program is running, and
    display an object for executing the second application program on the display based on a result of scanning for external servers.

9. The electronic device of claim 8, wherein the instructions, when executed by the at least one processor to:
    receive a user input via the object, and display a user interface including status information on execution of the second application program on the display based on the user input.

10. The electronic device of claim 1, wherein the external server is located in a base station or a core network connected to the base station.

11. A method of an electronic device, the method comprising:
   establishing a connection to an external server including a second application program executable in place of at least part of operations of a first application program via a radio communication circuit;
   executing, upon receipt of a first user input associated with the first application program, the first application program;
   displaying a first user interface of the first application program on a display; and
   displaying, upon receipt of a second user input associated with the first application program, a second user interface associated with the second application program on the display.

12. The method of claim 11, further comprising receiving information indicating that the external server includes the second application program during or after establishing the connection to the external server.

13. The method of claim 11, further comprising displaying an icon associated with the first application program and/or an indication associated with the second application program and overlapped at least partly with the icon on the display.

14. The method of claim 13, further comprising receiving the first user input via the icon and/or the indication.

15. The method of claim 13, further comprising receiving the second user input via the icon and/or the indication.

16. The method of claim 11, further comprising:
   receiving a third user input via the second user interface; and
   transmitting to the external server a request for executing the second application on the external server via the radio communication circuit based on at least part of the third user input.

17. The method of claim 11, further comprising synchronizing first data associated with the first application program of the electronic device and second data associated with the second application program of the external server.

18. The method of claim 11, further comprising:
   executing the first application program on the electronic device;
   scanning for external servers capable of executing the first application program while the first application program is running; and
   displaying an object for executing the second application program on the display based on a result of scanning for external servers.

19. The method of claim 18, further comprising:
   receiving a user input via the object; and
   displaying a user interface including status information on execution of the second application program on the display based on the user input.

20. The method of claim 11, wherein the external server is located in a base station or a core network connected to the base station.

* * * * *